US008130238B2

(12) United States Patent
Distler

(10) Patent No.: US 8,130,238 B2
(45) Date of Patent: Mar. 6, 2012

(54) METHODS AND FILES FOR DELIVERING IMAGERY WITH EMBEDDED DATA

(75) Inventor: Joshua D I Distler, Brooklyn, NY (US)

(73) Assignee: Joshua D. I. Distler, Brooklyn, NY (US)

( * ) Notice: Subject to any disclaimer, the term of this patent is extended or adjusted under 35 U.S.C. 154(b) by 991 days.

(21) Appl. No.: 11/615,216

(22) Filed: Dec. 22, 2006

(65) Prior Publication Data
US 2007/0146389 A1 Jun. 28, 2007

Related U.S. Application Data

(60) Provisional application No. 60/753,910, filed on Dec. 24, 2005.

(51) Int. Cl.
G09G 5/00 (2006.01)
(52) U.S. Cl. .......................... 345/619; 345/629; 715/766
(58) Field of Classification Search .................. 345/629, 345/619; 715/766
See application file for complete search history.

(56) References Cited

U.S. PATENT DOCUMENTS

| 5,673,377 | A | * | 9/1997 | Berkaloff | 345/585 |
| 6,028,583 | A | | 2/2000 | Hamburg | |
| 6,434,277 | B1 | * | 8/2002 | Yamada et al. | 382/285 |
| 7,425,958 | B2 | * | 9/2008 | Berger et al. | 345/427 |
| 2002/0011941 | A1 | | 1/2002 | Endo et al. | |
| 2002/0050988 | A1 | | 5/2002 | Petrov et al. | |
| 2004/0022444 | A1 | | 2/2004 | Rhoads | |
| 2004/0236748 | A1 | | 11/2004 | Coltrera | |

OTHER PUBLICATIONS http://www.photoshoplab.com/writing-on-the-wall-cs2-vanishing-point.html, Mar. 29, 2005.*
Dayton et al., "Photoshop 5/5.5 WOW! Book", 2000, Peachpit Press, pp. 25, 48, 79-81, 84-86, 88, 102-108, 182-184, 278-279.*
Microsoft Dictionary.*
International Preliminary Report on Patentability—Jul. 3, 2008.
International Search Report and Written Opinion—Feb. 13, 2008.
Adobe Photoshop CS2 Classroom in a Book, Adobe Press, May 24, 2005.

* cited by examiner

Primary Examiner — Michelle K Lay
(74) Attorney, Agent, or Firm — Steven R. Vosen

(57) ABSTRACT

The present invention is directed to the realistic three-dimensional presentation of images in scenes, and is particularly useful for easily illustrating how artwork would appear on a surface in a scene, such as on a billboard. In one embodiment, image files are provided for use in an imaging application, such as ADOBE® PHOTOSHOP® CS2. The files permit the placement of artwork on scene background, and include embedded surface data that instructs the imaging application to alter the appearance of the artwork according to its placement within the scene. Also described are methods of generating image files for use as templates, and the use of the image files.

52 Claims, 18 Drawing Sheets

| | | |
|---|---|---|
| 1201 | | |

| | | 1217 |
|---|---|---|
|  | highlight | |
|  | shadow | 1202 |
|  | bottle image | 1203 |
|  | background color | 1204 |
|  | artwork | 1205 |
|  | material color | 1206 |
|  | solid white | 1207 |

1208

| | | 1218 |
|---|---|---|
|  | highlight | |
|  | shadow | 1209 |
|  | bottle image | 1210 |
|  | background color | 1211 |
|  | artwork 1 | 1212 |
|  | artwork 2 | 1213 |
|  | artwork 3 | 1214 |
|  | material color | 1215 |
|  | solid white | 1216 |

# METHODS AND FILES FOR DELIVERING IMAGERY WITH EMBEDDED DATA

CROSS-REFERENCE TO RELATED APPLICATIONS

This application claims the benefit of U.S. Provisional Application No. 60/753,910, filed Dec. 24, 2005, the entire contents of which is hereby incorporated by reference herein and made part of this specification.

BACKGROUND OF THE INVENTION

1. Field of the Invention

The present invention relates to the field of image generation. More particularly, the present invention relates to methods and files that deliver imagery with embedded data that can be used to efficiently render design concepts.

2. Discussion of the Background

Graphic designers, artists and other creative producers typically use two techniques to present creative concepts in a manner which closely approximates the appearance of the final product. The first technique is that of physically building a prototype. Construction of a design prototype (e.g., for product packaging) typically requires the output of the design or artwork onto a material suitable in flexibility and strength for the building of prototype. The design or artwork is output onto paper using various printing techniques (including, for example, hand printing and inkjet printing), glued to a stiff material such as, for example, cardboard, trimmed and then folded and glued into final form. The difficulty of constructing a prototype varies greatly and depends on the complexity and form of the final design. For concepts that require materials other than paper or cardboard (e.g., translucent materials) "mocking up" (as this physical building process is called) can be extremely time consuming and costly. Once the concept is constructed it may be traditionally presented in physical form. Photographs of the physical concept may be made and presented in lieu of the concept, especially when transport of the physical concept is impractical.

Recently, artists and designers have begun to use computers to develop ideas. In addition the development of the Internet has led to the use of email as a common method for exchanging text and imagery. The wide-spread use and integration of software which can read and write high resolution image data in many file formats (including, but not limited to, Portable Document Format (PDF), Tagged Image File Format (TIFF), or Joint Photographic Experts Group (JPEG) formats) as well as increasingly available broadband connections to email and the web have greatly increased the use of high resolution imagery in representing various kinds of information.

Designers often exchange images with clients to represent design concepts. However, the ability to precisely communicate the subtle details and form of a design is lacking. Commonly, designers provide flat graphic representations of the concept to clients. These flat graphic representations lack the three-dimensional form and photographic cues to properly illustrate the design concept.

Simulating a design concept three-dimensionally on a computer is recent in comparison to constructing a design concept physically. Here, the process typically begins with constructing a virtual model "wireframe" on a computer inside a three-dimensional application. The artwork or design is then imported into the three-dimensional application and applied to a three-dimensional object. Lighting is set up inside the virtual scene, the virtual "camera" is positioned and a final image is rendered. This technique is also quite time consuming and requires a very specialized skill set which the artist or designer who created the concept rarely possesses. An important deficiency of this technique is that a reduction in the time spent building, lighting and rendering the model usually results in a substantially less realistic final rendering of the concept.

A hybrid of the two concepts is a promising approach. Here, a photograph of a "real" object or scene with computer imagery rendered onto the surface provides the realism of an actual photograph combined with the speed and convenience of three-dimensional rendering. However, constructing and photographing the object is still quite time consuming.

ADOBE® PHOTOSHOP® CS2, which is referred to herein simply as "Photoshop," is one example of a software application specifically designed for compositing imagery which is commonly used by photographers, retouchers, effects artists and designers to compose a final image from a number of photographic sources. Image compositing software such as Photoshop provides a useful method for applying artwork to a photographic surface with image layers and multiple compositing settings.

Many companies, commonly known as "stock photo agencies," sell "stock" illustration and photography to a worldwide market. Stock photo agencies sell images and illustrations of various objects and scenes for reuse by artists and designers.

Some companies sell "cut out" images (photos of objects with background and shadow information completely removed that have been placed on a solid white background). These images are solely flat images (i.e., they contain only one plane of image data where, for example, the white background runs together with the object image data as one continuous image). Occasionally, the images contain vector path data which allows an image to be trimmed out to appear on a transparent background.

The process for using these cut out images to create an on-screen photographic design composite is still quite time-consuming and complex since imagery applied to the surfaces of the objects or scenes depicted in these stock photos must be manipulated, stretched and hand trimmed in order to fit a surface. Without additional sophisticated retouching, a design concept cannot be pasted onto stock art, which are flat files that lack critical surface data.

Thus, current stock photos are only slightly more efficient than directly photographing the object. Accordingly, what is needed is photographic imagery which contains the necessary trimming and surface data to trim and map pasted artwork within a common compositing application such as, for example, Photoshop, that provides efficient methods of producing realistic looking design concepts.

BRIEF SUMMARY OF THE INVENTION

In certain embodiments, a data file is provided that includes imagery and embedded data that can be used to efficiently render design concepts.

In certain embodiments, a data file is provided that contains both an image and an apparatus for compositing imagery with that image, were compositing the imagery uses stacked layers that allow the user to easily add their artwork without disrupting the compositing.

In certain embodiments, a layered image file is provided that is readable by an imaging application for displaying an image. The image file includes at least two layers, which include at least one layer including a scene for display within the image, and at least one layer adapted to accept artwork and display the accepted artwork within a region of the image. The image file further includes embedded data including instructions readable by the imaging application to distort the accepted artwork, and the at least two layers include information to instruct imaging application to form the image by compositing. In certain embodiments, the at least one of the layers is a transparent layer or is an opaque layer.

In certain embodiments, a method is presented for useful for displaying an image in an imaging application. The method includes providing an imaging application compatible image file, where the file includes at least two layers and embedded data, where the at least two layers includes at least one layer including a scene for display within the image, and at least one layer adapted to accept artwork and display the accepted artwork within a region of the image. The embedded data includes instructions for the imaging application to distort the accepted artwork.

In certain embodiments, the method of providing includes providing the image file over the Internet or on computer-readable media. In another embodiment, the method further includes opening said data file within the imaging application, and placing artwork within at least one of said one or more artwork layers.

In certain embodiments, files for delivering imagery with embedded data are provided. In some embodiments, the file is a layered image file, comprised of a series of image layers which contain transparency, opacity and color value data organized together in a series of groupings which also contain transparency, opacity, vector based masking, and alpha channel data. The masking and alpha channel data may be used to specifically dictate trimming, pixel-by-pixel opacity and edging data for the image layers inside the grouping.

In certain other embodiments, the layered image file contains surface data, (i.e., a matrix of X-axis, Y-axis, and Z-axis three-dimensional spatial data) which corresponds to surfaces depicted in the image file. In this embodiment, the file is a layered image file comprised of (in order from topmost layer to bottommost layer) a series of "artwork layers" (image layers) organized in a series of "layer groups" (image layer groupings), which have specific transparency settings and associated "layer mask" (vector basking masking and/or alpha channel masking) artwork. Additionally, the layered image file, such as a Photoshop TIFF file, may contain embedded Vanishing Point planes with three-dimensional surface data. In this embodiment one or more transparent object or scene images, one or more layer groups which include one or more transparent object images, a number of layer groups with associated layers masks, one or more knockout masks, one or more object shadows and one or more background layers are provided.

In some embodiments the Photoshop TIFF file contains a vector path silhouette shape. In other embodiments, the file is an image file with embedded masking and perspective data that may be used with other image manipulation and compositing software. In still other embodiments, vector masks may take place of alpha channel or transparency masks so that the apparatus can composite photographic imagery with simpler vector based layers. In still other embodiments, the image with embedded data may act as an internal component to proprietary image editing software which works automatically to apply imported artwork to the surface of an object or scene. In sill other embodiments, embedded three-dimensional surface data may be created and used with a Photoshop surface or three-dimensional extension or plug-in.

In another aspect the present invention provides methods for delivering imagery with embedded data. In some embodiments, the method comprises the steps of taking a digital image of an object or scene, opening it in a software program, such as, for example, Photoshop, defining a silhouette of the object or portion of the scene to have embedded data with a path tool, separating the object or portions of the scene onto a transparent layer, creating layer groups with an associated mask for each face or object surface with the path tool and object silhouette, using the object silhouette to create one or more white shapes which precisely match the object or scene, removing the shadow or shadows from the photograph of the object image or scene and positioning the object or scene on a transparent layer, creating a solid white background color and creating layer group folders to appropriately house each artwork layer. The layered document may be saved, for example in layered Photoshop TIFF format or native format, PSD.

Certain embodiments are summarized above. However, despite the foregoing discussion of certain embodiments, only the appended claims (and not the present summary) are intended to define the invention(s). The summarized embodiments, and other embodiments, will become readily apparent to those skilled in the art from the following detailed description of the preferred embodiments having reference to the attached figures, the invention(s) not being limited to any particular embodiment(s) disclosed.

Figure 1:
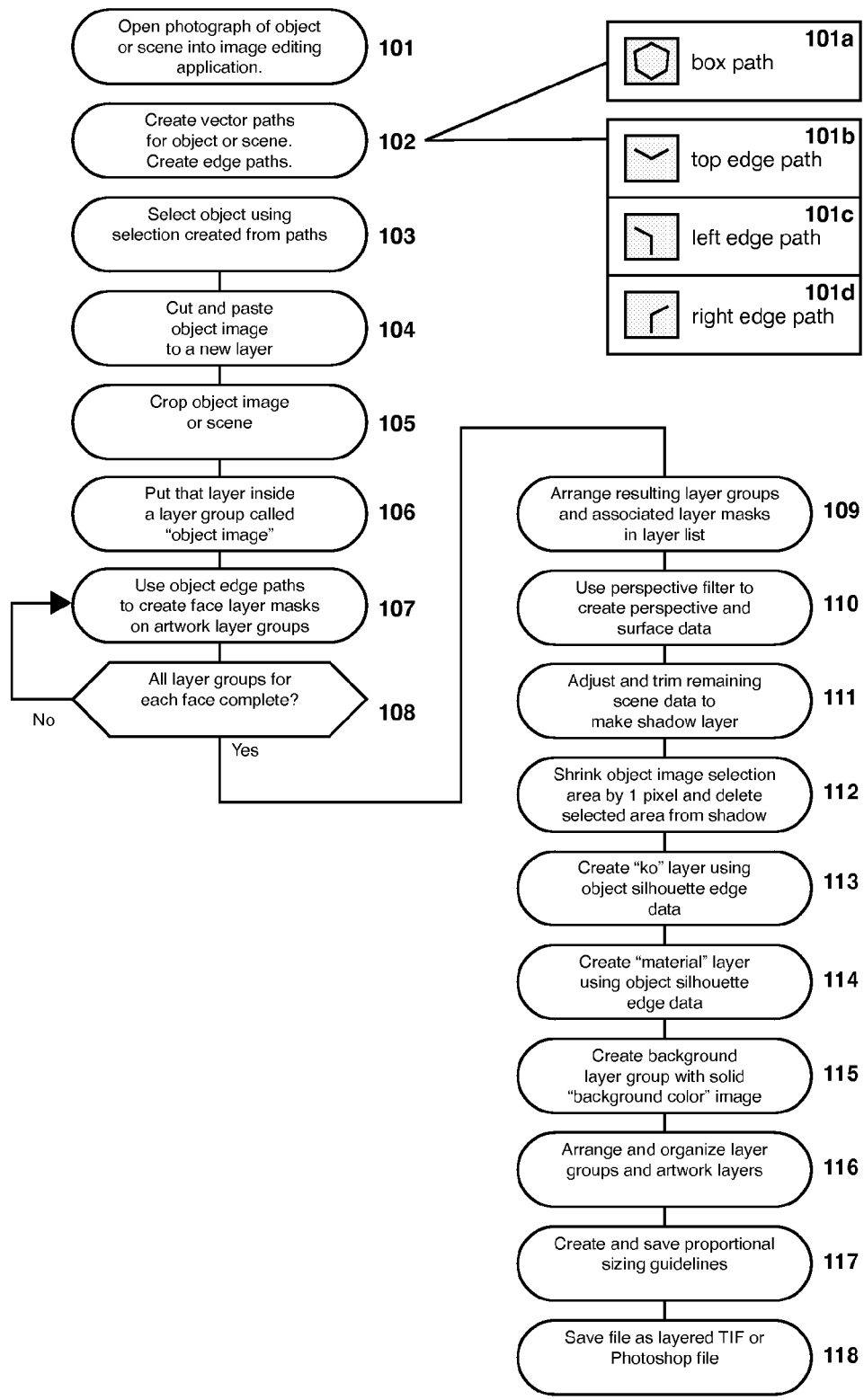
FIG. 1 is a flowchart illustrating one embodiment of a method for producing an image file with embedded data.

Reference symbols are used in the Figures to indicate certain components, aspects or features shown therein, with reference symbols common to more than one Figure indicating like components, aspects or features shown therein.

DETAILED DESCRIPTION OF THE INVENTION

Although certain preferred embodiments and examples are disclosed below, it will be understood by those skilled in the art that the inventive subject matter extends beyond the specifically disclosed embodiments to other alternative embodiments and/or uses of the invention, and to obvious modifications and equivalents thereof. Thus it is intended that the scope of the inventions herein disclosed should not be limited by the particular disclosed embodiments described below. Thus, for example, in any method or process disclosed herein, the acts or operations making up the method/process may be performed in any suitable sequence, and are not necessarily limited to any particular disclosed sequence. For purposes of contrasting various embodiments with the prior art, certain aspects and advantages of these embodiments are described where appropriate herein. Of course, it is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. While the systems and methods discussed herein can be used for placing images so that they appear to be on three-dimensional scenes, the systems and methods can also be used in other ways: for example, to provide children's coloring-book image files with coloring areas that have 3-dimensional properties, or, for example, to provide image files for medicine where the image file will run a series of embedded edge finding and contrast enhancing effects on a user's image before scaling and masking the image for presentation in slide format.

Disclosed herein are data files, methods for generating data files, and apparatuses and methods for distributing data files. In general, the data files are binary files that, when interpreted by an imaging computer program, produces an image. Such a data file is referred to herein, and without limitation, as an "image file." In general, an image file has a structure and/or format that is compatible for opening or inputting to an imaging application or that may be transformed or otherwise manipulated to be opened by or otherwise inputted to an imaging applications. Thus, for example, an image file may include binary data that conforms to an image file standard including, but not limited to, a Photoshop TIFF or native PSD format. Such a file may then be opened, for example, by an imaging application including, but not limited to, Photoshop and generate an image including, but not limited to, an image on a computer display or printer. The term "imaging application" refers, without limitation, to computer programs or systems that can display, render, edit, manipulate, and/or composite image files. Some of the discussion herein utilizes terminology regarding file formats and the manipulation or structure of file formats that is commonly used with reference to the Photoshop imaging application. It is understood that this terminology is used for illustrative purposes only, and is not meant to limit the scope of the present invention.

In another embodiment, an image file includes embedded data that is used to distort some or all of the image. The embedded data, which is referred to herein, and without limitation, as "surface data," may be thought of as data corresponding to the three-dimensional shape of an image surface. In one embodiment, the image file may also accept additional image information, for example by pasting a scene into the image file that is then distorted according to the surface data. Thus, as one example that is not meant to limit the present invention, the image file is a multi-layered file. A first layer includes surface data that is used to distort a scene of a second layer. Thus, for example, the first layer may contain surface data corresponding to a three-dimensional object, such as an inclined plane, cylinder, sphere, or a more complex shape, and the second layer may contain a two-dimensional scene (either a raster or vector image) at the location corresponding to the surface data. When the first and second layer are provided to the imaging application, the application distorts the second layer according to the embedded information of the first layer, producing an image of the scene as distorted by (or wrapped about) the surface data. Thus inclined plane surface data provides perspective to the scene, while cylindrical or spherical surface data distort the scene as it would appear if wrapped about the corresponding three-dimensional surface.

Figure 17:
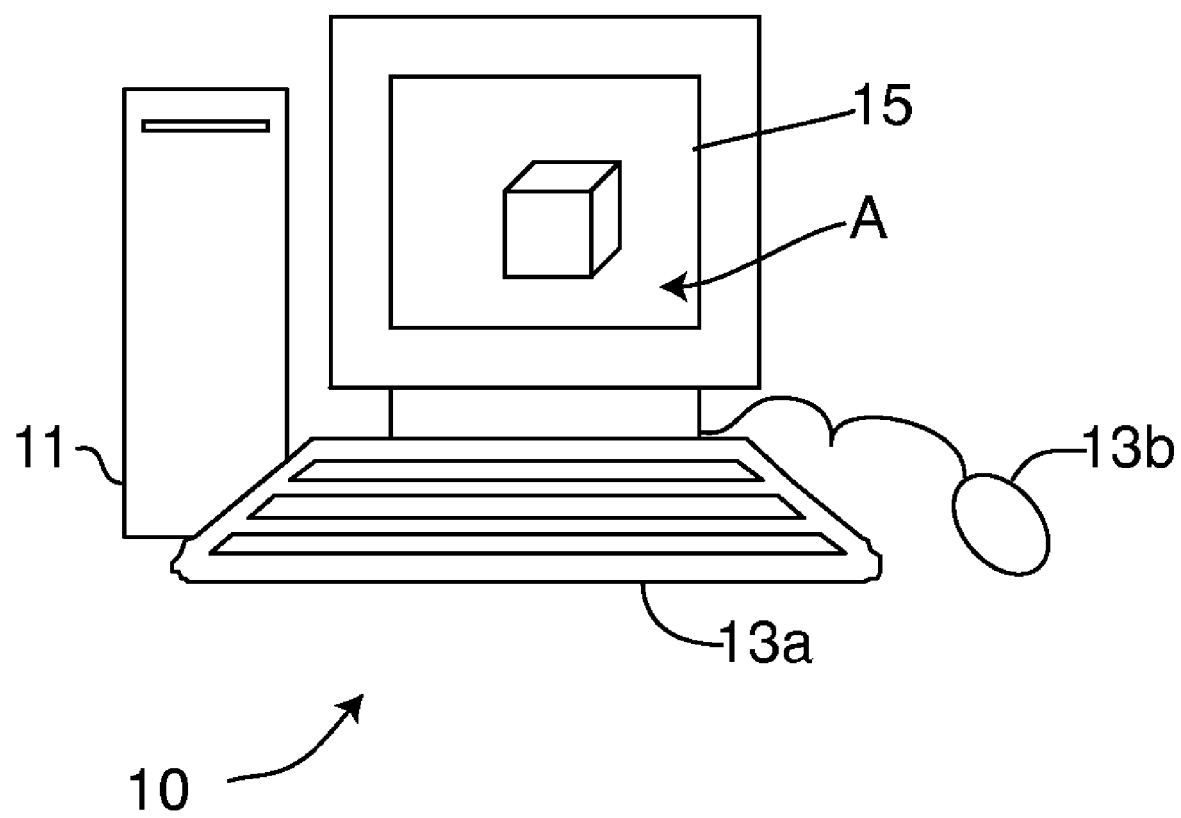
FIG. 17 is one embodiment of a computer system for viewing image files as described herein.

FIG. 17 is one embodiment of a computer system 10 for viewing image files as described herein. Computer system 10 includes a processor and memory 11, one or more input devices 13, and a display 15. The input devices 13 include, but are not limited to a keyboard 13a and a graphical input device, such as a mouse 13b. Computer system 10 is particularly adapted for the production, manipulation, and or generation of images (shown, for example as image A on display 15), may also include additional devices (not shown) including but not limited to printers, additional displays, and additional or other input devices, and additional processors and/or memory. In one embodiment, computer system 10 includes the ability to execute instructions of an imaging application to generate or manipulate image files to produce images.

Figure 18:
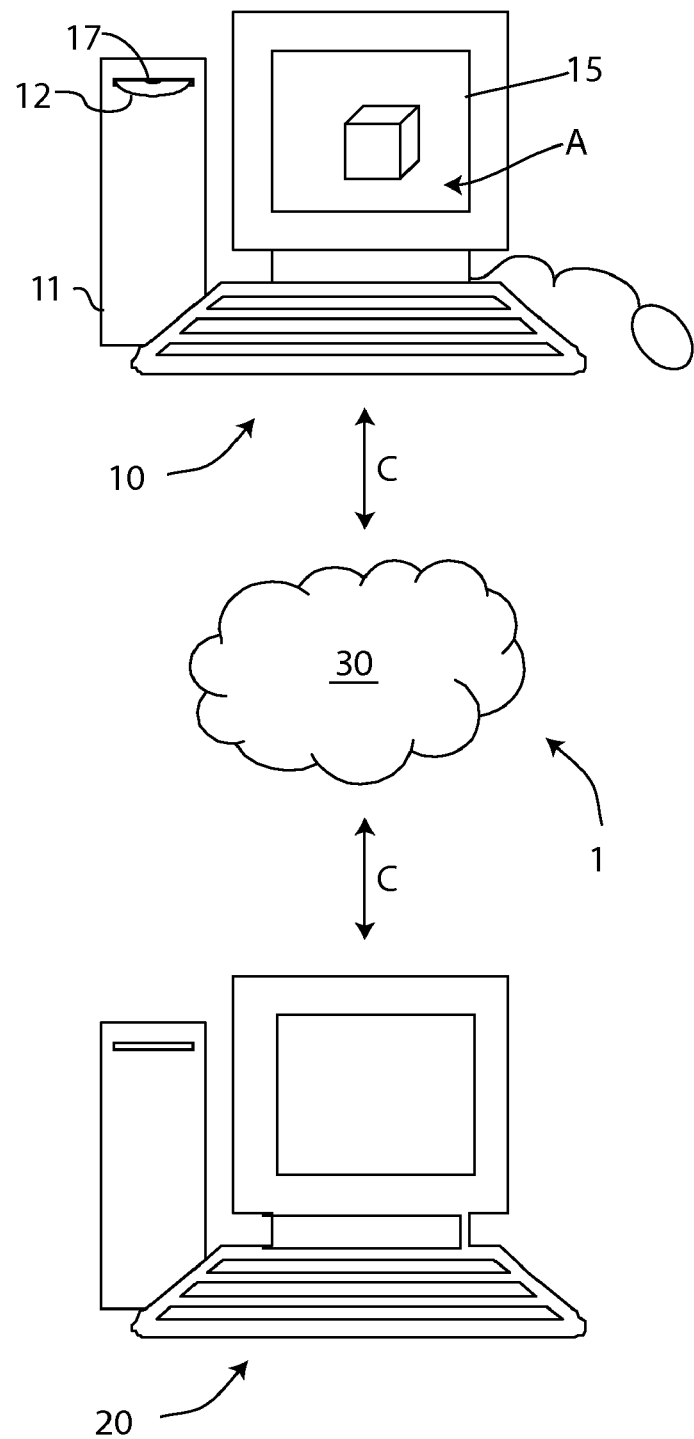
FIG. 18 is another embodiment of a system for viewing image files as described herein.

FIG. 18 is another embodiment of a system 1 for viewing image files as described herein. System 1 may be generally similar to the embodiment illustrated in FIG. 17, except as further detailed below. Where possible, similar elements are identified with identical reference numerals in the depiction of the embodiments of FIGS. 17 and 18.

System 1 illustrates a system for the transfer of image files or other information to or from computer system 10. As shown in FIG. 18, system 1 also includes a second computer system 20, and a network 30. Network 30 may be, but is not limited to, combinations of one or more wired and/or wireless networks adapted to transmit information between computers and may be, without limitation, the Internet or any other communication system. Computer systems 10 and 20 may communicate through network 30, as indicated by arrows C. Communications includes, but is not limited to, e-mail or the mutual access to certain web sites. In addition, FIG. 18 also shows a removable media device 17 of computer system 10, and a removable media 12 being inserted into media device 17. Removable media 12 may be, for example and without limitation, a readable or a read-write device capable of accessing information on a CD, DVD, or tape, or a removable memory device such as a Universal Serial Bus (USB) flash drive.

In one embodiment, image files, which may contain embedded data, are provided to computer system 10 on removable media 12. In another embodiment, image files, which may contain embedded data, are provided to computer system 10 from computer system 20 over network 30.

In another embodiment, the embedded data cannot be interpreted by the imaging application without providing the imaging application with access to additional software. Thus, for example, interpretation of embedded data by the imaging application may require additional software either within, or accessible to, the imaging application. The additional software may be provided to computer system 10, either with or separate from the image file, as a software upgrade to the imaging application or as a plug-in to the imaging application. The software upgrades or plug-ins may be provided to computer system 10 through media 12 or over network 30.

In one embodiment, image file is produced entirely on computer system 10. In a second embodiment, the image file is provided to computer system 10 via media 12 or network 30. In a third embodiment, the image file is provided to computer system 10 via media 12 or network 30, and may be uses as a "template" onto which other images or artwork may be added and subsequently manipulated by the embedded data of the image file.

FIG. 1 is a flowchart illustrating one embodiment of a method for producing an image file having embedded data. Specifically, and without limitation, the flowchart of FIG. 1 describes a method for delivering imagery with embedded data onto a photographic image. An image file prepared according to the method of FIG. 1 may then be used to import additional images, which are then distorted according to embedded data. Thus, for example and as described subsequently, an image file generated according to the method of FIG. 1 may be used by an image editing application, including but not limited to Photoshop on computers system 10, to place and distort an imported image according to the embedded surface data. As one embodiment, the method of FIG. 1 describes a method of producing an image file that includes multiple layers and which is manipulated by an imaging program that can edit and composite such an image file.

At block 101, a digital representation of a photographic of an object or scene (referred to herein without limitation as the "scene") is opened in an imaging editing application. In some embodiments, the digital representation is loaded into an imaging application that includes editing and compositing features. At block 102, vector paths, including but not limited to Bezier lines (or "Paths"), are drawn to correspond and define a silhouette of an object within the scene that has a three-dimensional shape, which may then be edited at block 101a. As described subsequently, embedded data is assigned to the region defined by block 101a. After the object silhouette has been drawn and saved as one complete path, additional paths may be drawn which define the edges of portions of the silhouetted object, at blocks 101b, 101c, 101d, etc. The edges may then be used to partition the region defined at block 101a into object portions. In the embodiment of FIG. 1, the images shown in blocks 101a-101d correspond to a silhouette of a perspective view of a box object (block 101a) and edges of the box faces that are within the silhouette faces (blocks 101b-101d). Layering of additional objects having different silhouettes requires the repetition of block 102 for each object. In some embodiments, such as the one illustrated in FIG. 2, there is only one object silhouette (of a box object), and three regions (each face of the box) within the object.

A path that defines the object silhouette is selected and converted to a selection at block 103. Next, the selection of block 103 is used to cut the image of the object from the scene, and the cut out image is pasted in place on a new image layer at block 104. At block 105, the scene and its shadow are optionally cropped to provide a margin, such as a one inch margin.

The silhouetted object is then put into a layer group folder which has transparency settings set to "pass-through", while the object image is set to "Multiply" at block 106. In some embodiments, the layer group folder is named "object image". In other embodiments, the layer folder may be called "scene image," "surface image," or another name relating to the photograph of the object or scene contained in the layer group.

Next, the object regions are identified and manipulated. As an example, each object region is masked off (in Photoshop this may be accomplished by command-clicking or alt-clicking the trimmed object image) to define the edge of the silhouetted object and then, using the appropriate object edge path, as defined at block 102, remove, crop, or add other faces to/from the object selection to make a solid, anti-aliased selection at block 107. The resulting selection of the object region is then used to create a "layer mask" which is applied to the layer group which represents the face. For example, a layer mask of the top surface for a cube shaped box is created. The layer mask is associated with or attached to a layer group called "top face" which contains blank artwork layers called "top face artwork" into which a user may paste artwork.

The method of block 107 is repeated for each object region at block 108. At block 109 the The resulting layer groups and associated layer masks as created at blocks 107-108 are "stacked" in the layers list immediately below the "object image" layer group and above "material." In other embodiments, the face layer groups may come after the "material" layer group but before "object ko+shadow" as described in FIG. 9.

Surface perspective and shape detail is added to each object region at block 110. For a box object having planar face regions, surface perspective and shape detail is added by creating and positioning a perspective plane for each face. The edge of the perspective face ideally aligns closely to the respective edge of layer mask of the face. If the perspective grid does not align with the layer mask face adjustments, the paths that indicate faces edges must be made and blocks 106-107 must be repeated. In another embodiment of the invention, the method for creating three-dimensional surface data may done in a more automated fashion: for example, after the scene has been photographed, a second image of the same object or scene with a grid of evenly spaced marks applied to the face or surface will be photographed from the same position as the first image. The second photograph of the scene with the grid of marks on its faces or surfaces will then be used to define the three-dimensional surface data for the first image. In still other embodiments of the invention, surface details, for example, curves, slopes, bumps, texture, and edge details, may be added to the surface plane in order to accurately represent the surface.

The remaining background data is then cleaned up at block 111. Image contrast and levels controls are used to make the background of an object on a white background pure white, while keeping shadow data intact by increasing the contrast of the image. Spot cleanup through the use of image editing tools such as, for example, brush, eraser, or Healing Tool can fix shadow details or spot out dirt and other non-white data in the white area. The entire white background with shadow data (and the hole created by the removal of the object from the background in block 104) are cut and pasted into, for example, the Photoshop "Quick Mask" tool. The Quick Mask tool converts color data to grayscale and then grayscale to transparency values. For example, a solid black square on white ground will create a square selection area which is 100% opaque, a 50% grey square on white ground will create a square selection which is 50% opaque, etc. Therefore, when a shadow on white ground is pasted into the Quick Mask, a selection that follows the shading of the shadow and background is created which is filled with a neutral or slightly warm grey tone. The transparency values of the selection, as defined by the Quick Mask tool, mean that the shadow is partially transparent in the darkest areas and completely transparent in the lightest areas. The shadow on the transparent background is put into a layer called "shadow." With an object visible on a superior layer, the shadow is reduced in scale by about 5% to remains aligned with the object.

A selection area is created corresponding to the object image area created in block 107 (selected, for example, by command or alt-clicking the object image area in Photoshop) at block 112. The selection area is then contracted by one pixel, the "shadow" layer is selected, and the selected area is deleted. This effectively trims the shadow so that it only overlaps the object image and "ko" layer by a single pixel, which removes any visual gaps between the object and the shadow layer. The transparency of the shadow layer is set to "Multiply" so to transparently composite with any image or color data on the "background" layer.

As in block 107, the outline of the photograph object in layer group "object image" is defined at block 113. Next, a new layer is created and the defined area is used to create a solid white shape, which is a white region or object silhouette. The transparency of this layer is set to "Normal" to affect the layers below as an opaque image. In some embodiments, the transparency of the layer may be adjusted to simulate translucency or transparency. The process, supra, is repeated for each respective image in the "object image" layer group. The layer with the solid white object silhouette is then name "ko". When multiple "ko" layers exist, the layer is named with the name of the object image photo+"ko". For example, when two images inside the "object image" layer group are called "cd case" and "cd" then the ko layers would be titled "cd case ko" and "cd ko," respectively. The layers are then reordered so that the "ko" layer or layers sit above the "shadow" layer. A layer group titled "object ko+shadow" is created. Both "ko" and "shadow" layers are placed inside the "ko+shadow" layer group as shown at layers 207-209 in FIG. 2.

Using the same selection technique as was used to create the "ko" layer in blocks 107 and 112, a layer mask is created for a layer group titled "material" and the transparency of the "material" layer group is set to "Multiply" so that the edge and color data information will merge cleanly with edge mask information at block 114. An empty layer is placed inside this layer group and titled "material color" and this layer group is positioned above the "object ko+shadow" layer group. A layer group folder is created with transparency set to "Normal" at block 115. The layer group is titled "background" and a solid color (in this embodiment, white) or photographic image is put into a layer "background image" which is placed inside the "background" layer group. The "background" layer group is ordered so that it is at the bottom of the layers. Once all layers have been built, each layer's transparency settings are reviewed and adjusted as needed to correctly effect how the layer artwork will composite to the photographic image at block 116. Any remaining layers that are not in a layer group are arranged in layer groups, for example, as depicted in FIG. 2.

A sizing guideline is created by drawing and applying a vector or image based measurement grid each object region (or surface) of the associated scene in order to accurately judge the proportional size or relative X and Y dimensions, that artwork must have in order to scale edge-to-edge at block 117. The measurements are then used to create a single page group of outlined shapes which match the proportions of each face measured. For example, if a face is 10 units wide and 5 units high and the face is a rectangle with square edges, then a simple square may be drawn with a width of 2 units and a height of 1 unit or a width of 20 units and a height of 10 units. If other faces are measured and drawn on the same page then these faces must be measured and drawn using the same scale. For example, when the square is drawn to 20 by 10 units, and the next face is 3 units wide and 5 units high, the next square drawn is 6 units wide and 10 units high. The absolute size of shapes is usually based on the size required to fit shapes onto a page. Once all surfaces have been measured and drawn to scale, the page may be saved in either vector format, such as, for example, ADOBE® ILLUSTRATOR®, which is referred to herein simply as "Illustrator", or high-resolution raster (bitmap) format. The sizing guideline apparatus may be used to build artwork before copying or exporting the artwork to the image file.

The file may be saved, for example, as a layered Photoshop TIFF file at block 118, or in any other format which maintains the embedded layers and does not flatten the image. In some embodiments the file is a Photoshop TIFF and has the layer structure depicted in FIG. 2.

Figure 2:
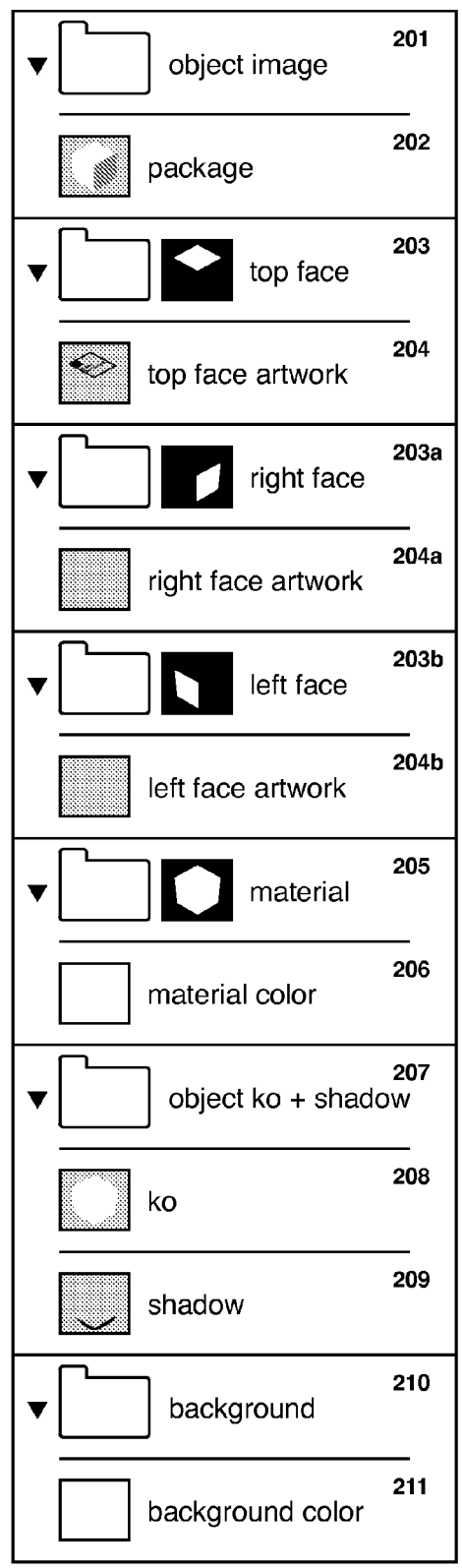
FIG. 2 is a schematic illustration of the layers of an image file including embedded data, as represented in a Photoshop layers palette.

FIG. 2 is a schematic illustration the layers of an image file including embedded data, as represented in a Photoshop layers palette on, for example, computer system 10. The layers shown in FIG. 2 are some or all of the layers generated using the method embodied in FIG. 1. The layers of FIG. 2 include layers 201 through 211.

Layer 201 is a "pass through" layer group, which does not dictate the transparency of its enclosed layers, and instead allows those layers to follow their own individual transparency settings.

Layer 202 is a "multiplied" (transparent) layer containing a photographic depiction of the object which has been set to "multiply" transparently in order to composite onto layers 203-211. Layer 202 provides context, shading and the maximum true object or scenic representational photographic data for the final image with transparency values which isolate the object component of each scene from background. For example, an image of a square cube on white is a photograph of the square cube isolated on a transparent background with no shadow information or background information. Or, in another example, an image of a transparent CD tray with CD is represented as a solid object with the background and shadow of the image removed. In other embodiments, the layers may composite to form a different object or scene. In numerous embodiments, the object or objects in layer group 201 would be represented without the background scene located in layer group 210.

A pass though layer group with an associated layer mask which is designed to contain all enclosed layers to a boundary area within the object image is depicted in layer 203. The layer mask may be used to dynamically "trim" enclosed layer artwork to a single face of a surface belonging to the object depicted in 202 where each following layer mask (203a and 203b) shall trim enclosing artwork to its respective face.

A "normal" (opaque) layer or layers that is or are intended to be user customized and used as a target for pasting in artwork or imagery to be applied to the image are found in layer 204. A user may, during the use of these layers, modify the transparency settings to be transparent in order to achieve various ink effects.

Layers 203a-204a, 203b-204b are additional pass through layer groups with associated alpha channel masks which constrain the layers of each group and the artwork pasted into these layers to the top, left and right faces, respectively. In some embodiments, any one of these layer groups may have varying overall opacity settings to simulate different types of printing or surface.

Layer 205 is a transparent layer group which has transparency set to "Multiply" to avoid pixel-on-pixel lightening in anti-aliased areas, with the goal of cleanly compositing the enclosed normal layers.

Layer 205 is a normal layer, that is, an opaque layer which is user customized to alter the overall surface of the object in the final resulting image. In some embodiments, layer 205 contains an opaque, solid color. In other embodiments, layer 205 contains photographic or graphic imagery. In still other embodiments, layer 205 is empty.

Layer 207 is another pass through layer group.

Layer 208 is a normal or opaque layer which is as an opaque or partially opaque mask that hides overlapped pixels in layers 209-211. In some embodiments, layer 208 contains a solid color which is white in appearance and has an RGB color value of 255, 255, 255, respectively. In other embodiments, layer 208 is comprised of multiple layers, each with corresponding shape and transparent that mimics the layers contained in layer group 201.

Layer 209 is a transparent layer with shadow data with transparency data where the shadow data goes from solid or partially transparent in darker shadow areas to completely transparent in the lightest shadow areas. The shadow image data of layer 209 overlaps the outer edge of layers 202 and 208 by 1 pixel to avoid any visual gaps between layers 202 and 208 and the shadow image on the shadow layer.

Layer 210 is another pass through layer group.

Layer 211 is an opaque layer. In some embodiments, layer 211 is a filled solid color with RGB values 255, 255, 255, respectively.

Figure 3:
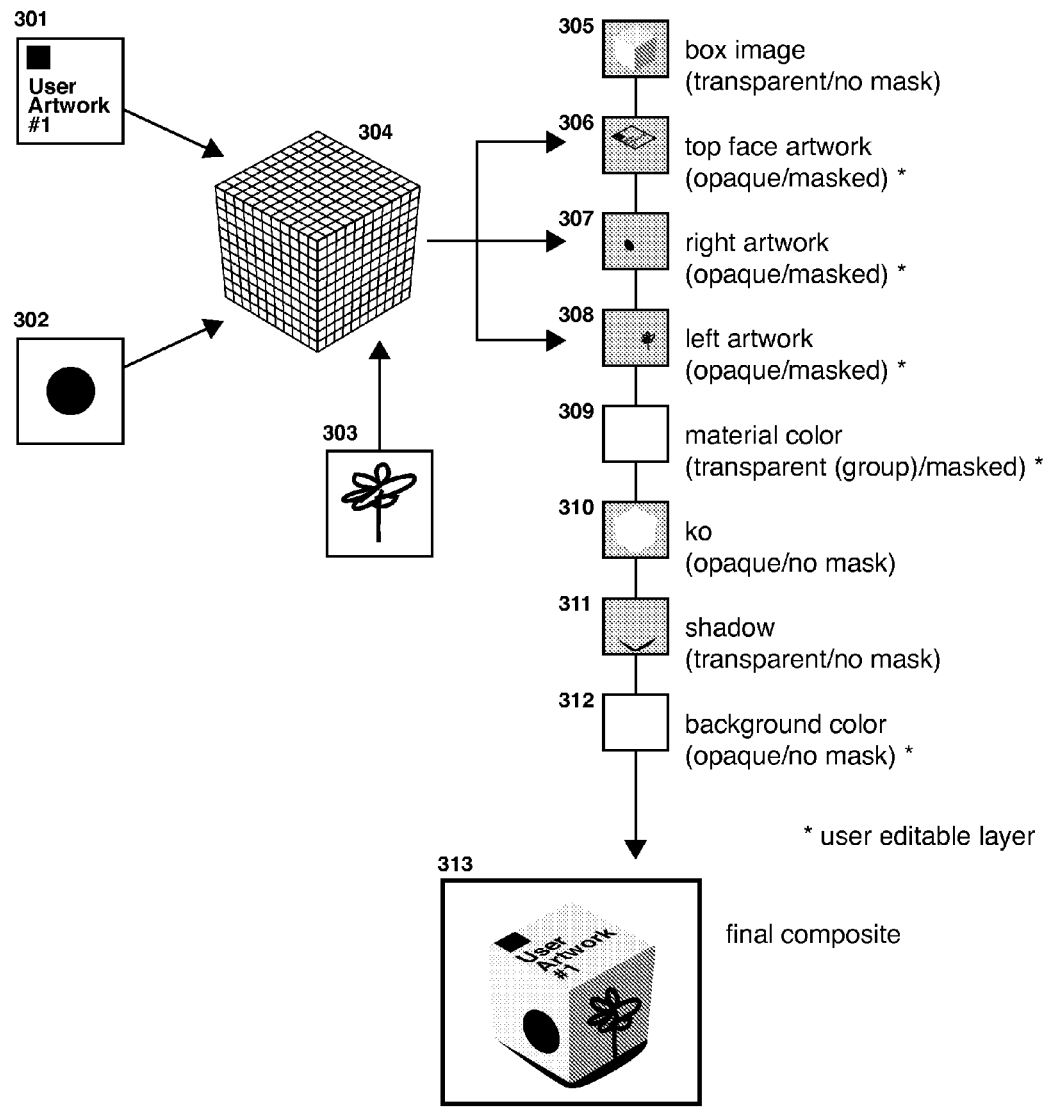
FIG. 3 is a representation of the flow of image data to provide a final composite image.

FIG. 3 is a representation of the flow of image data to provide a final composite image. As described subsequently, FIG. 3 illustrates the placement of artwork into an image file, including but not limited to an image file produced by the methods of FIG. 1 and/or represented by the layers of FIG. 2. More specifically, FIG. 3 illustrates an image file of a cube (shown as including layers 305 through 312 as might be seen, for example, within Photoshop on computer system 10) that can accept and manipulate artwork onto each visible cube face. As described in more detail subsequently, layers 306, 307, and 308 correspond to layers having embedded surface data and that can accept imported artwork images, such as vector or raster image format artwork 301, 302, and 303, and manipulate the images according to embedded data, to produce a final composite image 313, such as an image A. Further, when displayed using an imaging application, such as display 15, image generated by layers 305-312 displays a frame 304 on the display, corresponding to the embedded data region of layers 306, 307, and 308, to assist in the placement of images 301, 302, and 303. Thus, for example, artwork which has been created in a vector or raster image format is first sized using proportioning guidelines that are supplied as numeric dimensions or as visual shapes which mimic the proportion of each object surface at 301, 302, and 303. The correctly proportioned artwork is then exported or "copied" from the source in which it was created and then imported or "pasted" into an image editing and compositing application, for example, Photoshop, so that the artwork for each face is its own document. In this embodiment, the artwork images contain transparency data so that the artwork "floats" on a transparent background. In other embodiments, the artwork data may contain no transparency data.

Frame 304 provides a visual cue or guideline as to the shape that the artwork 301, 302 or 303 will be distorted to when imported into one of layers 306, 307 or 308. Frame 304 may be a grid-like image, as shown in the figure, or may includes lines, marks, or other visual cues as to the shape of the corresponding embedded surface data.

The export/import, moving, and placement of artwork from the sizing guidelines to the object or scene face or surface happens under the manual control of a user. In another embodiment, the process for importing the artwork happens automatically: the apparatus in this embodiment may take the form of a self-contained software application, a plug-in extension to existing software applications, documents within imaging applications, or the form of any combination thereof. In any case, the apparatus will, in order to automatically apply artwork placed in a specified region of the sizing guideline to the appropriate face or surface of an object or scene, constantly monitor the appropriate region of the sizing guideline. When a change is made to the area contained within the guideline region the apparatus will automatically load the artwork contained within that region, apply relevant two-dimensional or three-dimensional transformations and calculations in order to apply the artwork to the face or surface, and then re-render the composite resulting three-dimensional image. The appearance to the user will be that the flat sizing guideline region is both a two-dimensional representation of the three-dimensional surface to which they wish to apply the artwork and that there is a precise, predictable link between artwork placed on the two-dimensional region and the artwork that automatically appears on the face or surface of the final three-dimensional object or scene image composite.

In one embodiment, three-dimensional surface data is linked to all user editable face layers. Thus, for example, when images 301, 302, and 303 are provided to layers 306, 307, and 308, respectively, the embedded surface data in each layer is applied to the corresponding image. In the embodiment of FIG. 3, for example, the embedded data is applied to images by selecting the appropriate artwork document at 301-303, copying the artwork to the "clipboard", selecting the appropriate artwork layer at 306-308, activating the perspective filter or tool (which in this embodiment is the Vanishing Point filter within Photoshop), pasting the image onto the perspective filter (represented here at 304), positioning the artwork (as in FIG. 5 at 507) using the mouse and transformation tools as needed (for example scaling, rotation, or other distortion tools), and then accepting the position. Once the invention's user accepts the positioning of the image, within the perspective filter or tool, the perspective and surface data assigned during the embedding of perspective data in the image, which is now contained within the image and recalled by the perspective filter, is used to alter the artwork and reorient it in space in a way which is appropriate to the accepted surface in order to accurately mimic the appearance the image would have when applied to a real surface having the same or similar orientation. After altering the image, it is pasted back into the artwork layer which was selected earlier at 304. This step is then repeated as needed for each respective artwork and destination face or layer group. The artwork layers are considered user customizable layers. Each artwork's layer group folder is masked to an object face, surface, or element.

The object image at 305 is not considered a user customizable layer. However, the invention's user may choose to customize any component as, in this embodiment, all of the layers are editable. The object image is a transparent layer and its layer group folder is unmasked.

The "material color" layer at 309 may be filled with imagery, pattern, or solid color. Or, the material color layer may be left unchanged. In other embodiments, the material color will be composited above and placed in a superior position to the layers at 306-308 in the layer list, so that the material color overlays all artwork. This would be done, for example, in a situation such as a semitransparent CD case, where the CD artwork may be tinted by the cases material color, texture, or image. The material color is considered a user customizable layer. Its layer group folder is masked to the silhouette of the object.

The artwork layers at 306, 307, 308, are intended to be user customized with artwork and are intended to receive user artwork for each respective object surface. In some embodiments, the layers receive the user artwork after it has been applied to a three-dimensional surface at 304. In some embodiments, vector or alpha channel based masks trim the artwork layers at 306, 307, and 308 and trim the user artwork before superimposing it transparently, opaquely, or a partially opaquely, over lower layers, represented by 309 through 312.

The "ko" image at 310 is not considered a user customizable layer. However, the invention's user may choose to customize any component as, in this embodiment, all of the layers are editable. One example of user customization might be as simple as changing the opacity of the ko image in order to give the object as translucent appearance. The ko image is an opaque layer and its layer group folder, called "object ko+shadow" is unmasked.

The "shadow" image at 311 is not considered a user customizable layer. However, the invention's user may choose to customize any component as, in this embodiment, all of the layers are editable. One example of user customization might be as simple as changing the opacity of the shadow image in order to lighten its appearance on the background. The shadow image is a transparent layer and its layer group folder, called "object ko+shadow" is unmasked.

The "background color" layer at 312 may be filled, for example, with imagery, pattern, or solid color. Or, the background color layer may be left as the default white shade. Should the invention's user wish to create a background image that appears to be in perspective, the process which occurs at 304 for applying artwork to a face should be followed with the face closest in orientation to the estimated or desired orientation of the background surface. For example, in most cube-like or square edged objects the closest face will be the top face or face which sits most horizontally in space. The background color is considered a user customizable layer. Its layer group folder is unmasked.

To display a final composite image at 313, the layers at 305-312 follow their respective layer masks and transparency settings in order to do the math to create a single image. The final composite image appears, in this example, inside Photoshop while the layers remain separate editable elements. In other embodiments, the final composite image may be a flat, non-editable image created by flattening the layers at 305-312.

Figure 4:
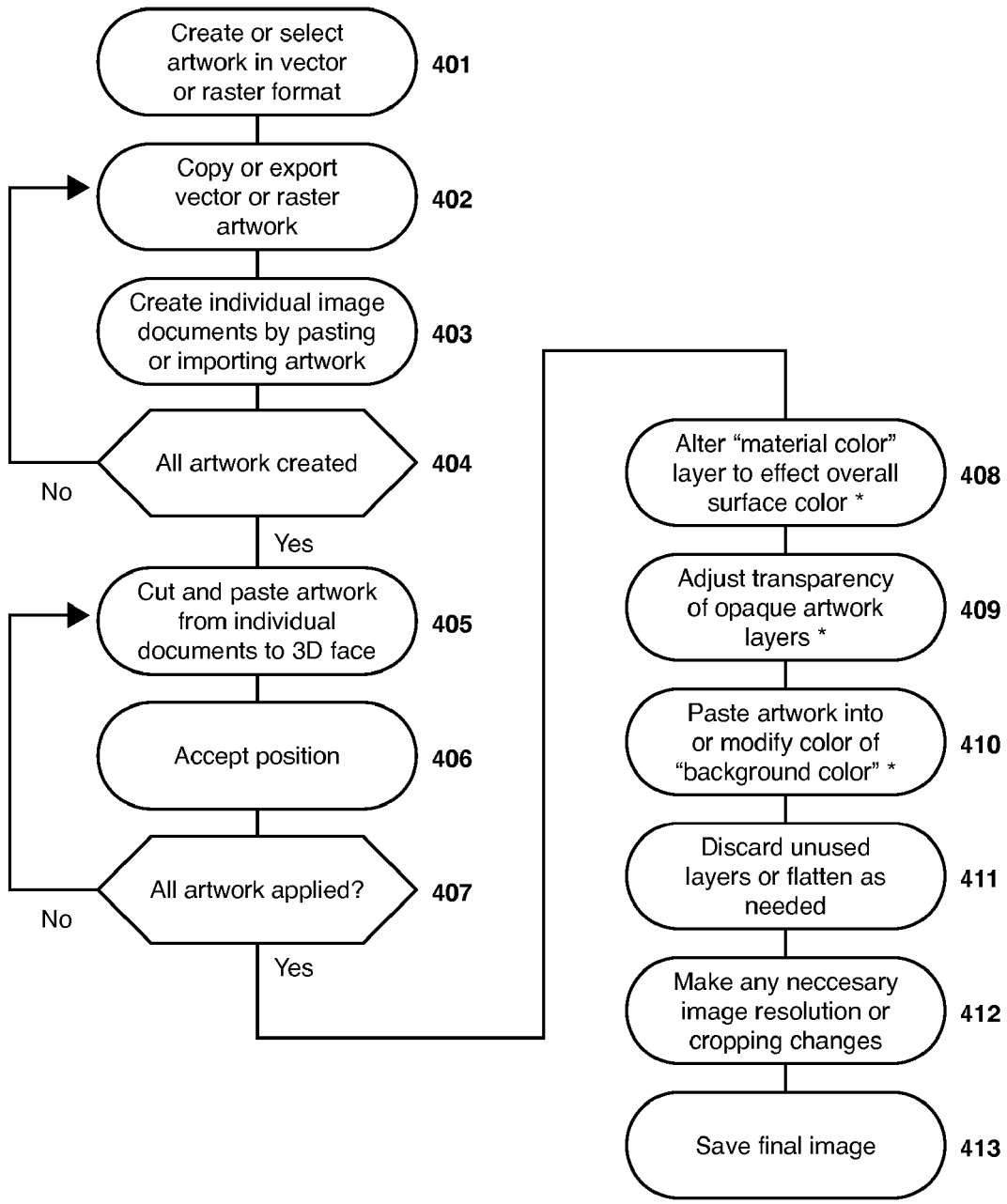
FIG. 4 is a representation of a method of building an image by importing artwork into a image file having embedded data.

Referring now to FIG. 4, which is a representation of a method of building an image by importing artwork into an image file having embedded data, which may be, for example, the flow of data of FIG. 3.

In one embodiment, artwork is created in a vector format, for example Illustrator vector format, at block 401. The vector format artwork is then copied from Illustrator to the computer's clipboard at block 402 and pasted into a new document, for example a Photoshop document, which converts the artwork to a raster (bitmap) image format at block 403.

The steps at blocks 402 and 403 are repeated for each piece of artwork at block 404.

At block 405, the artwork for the appropriate face is selected and then copied. Then, the appropriate artwork layer is selected and at block 405 the perspective filter (in this embodiment the Vanishing Point filter in Photoshop) is selected and the artwork is positioned on the appropriate face.

At block 406, after the invention's user is satisfied with the artwork's position and scale they can accept the position to render and save it to the artwork layer, as selected in block 405.

If artwork is to be applied to other faces then this process at blocks 407 and 408 is repeated as necessary at block 407.

Optionally, the material layer may be modified with a solid color or image at block 408. This is a global change that will alter the entire surface of the object or scene.

Optionally, the overall opacity and transparency of the artwork layers may be adjusted to create other effects at block 409. One example is simulating transparent, instead of opaque, inks by changing an artwork layer's transparency from "Normal" to "Multiply". Another example would reducing the shadow opacity (from 100% to 50%, for example) to make an object's shadow more subtle.

Optionally, the background color layer may be modified with a solid color or image at block 410. This will change the background that the object sits on or the overall tint in a scene. The background layer may also be turned off in Photoshop so that the object floats on a transparent layer in order to save the final composite image for use in other applications, for example Illustrator.

The layered image may be flattened or merged in order to discard unused layers and reduce file size at block 411. For example, this flattened or merged file may take the form of a one layer file with transparency data, a flat RGB image on a white background, or a three layer file with the object, shadow, and background remaining as separate layers.

Any image resizing, recropping, tinting, or image format changes may be applied at block 412 before the image is saved.

The final image may be saved in any one of a number of formats at block 413. For example, the image may be saved as a layered (TIFF or PSD) or flat (JPEG or Macintosh Picture (PICT)) format that is readable by Photoshop, other applications, or output devices.

Figure 5:
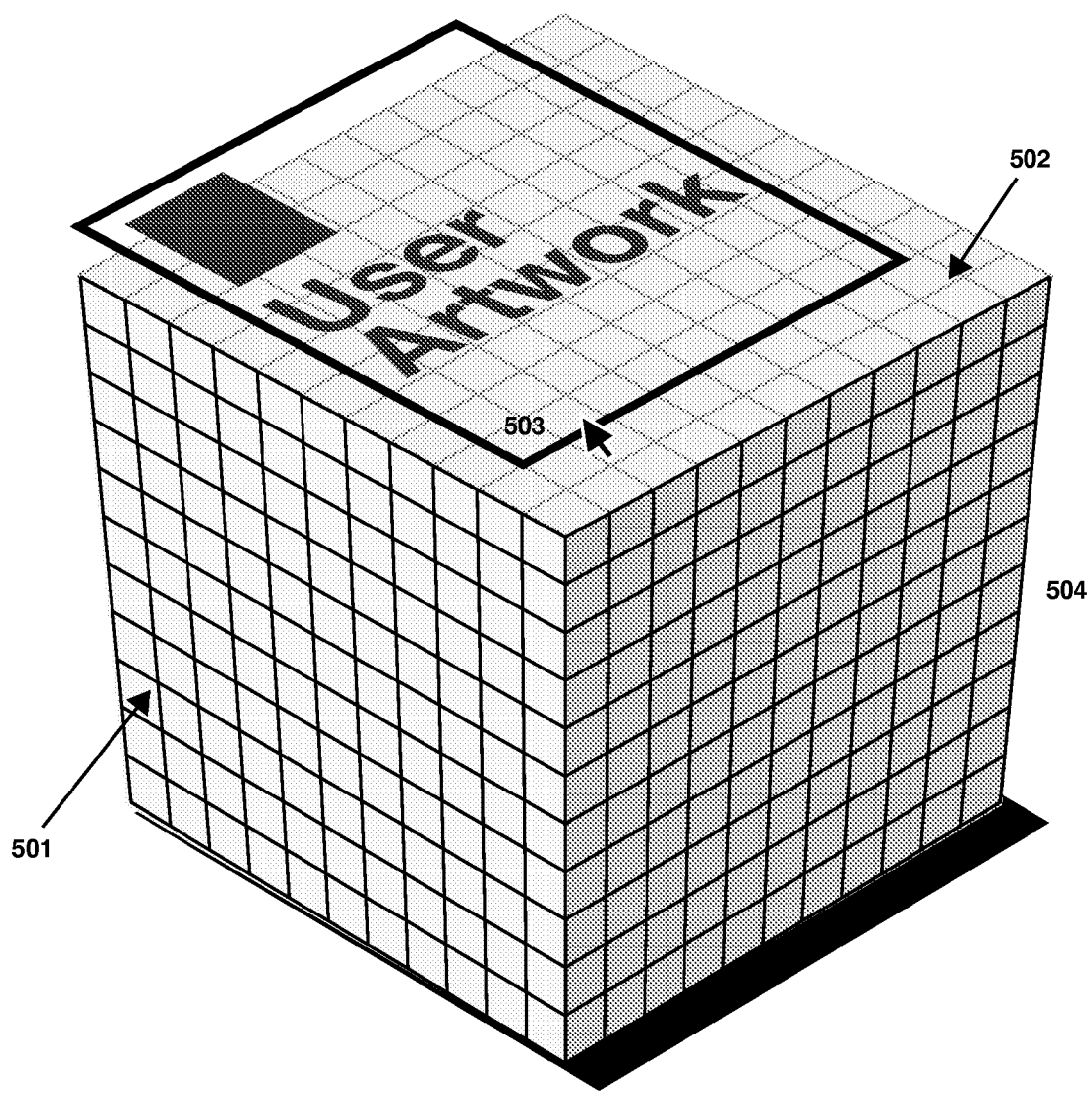
FIG. 5 is a representation of placing user defined artwork on a three-dimensional surface.

The placement of artwork images and the manipulation by embedded data will now be described with reference to FIG. 5, which is a representation of placing user defined artwork on a grid representation 501 of a three-dimensional surface, and includes a top region 502 and a side region 504 of grid 501. Also shown in FIG. 5 is an artwork image 503 shown as being positioned over top region 502. In one embodiment, grid 501 and image 503 are presented as image A by an imaging application to aid a user in placing artwork on an image containing embedded data. Grid 501 corresponds to an image region having embedded data, and may be generally similar to frame 304. In the embodiment of FIG. 5, the object is a cube shaped box and the three-dimensional grid structure is made up of three connected three-dimensional planes. The planes are carefully positioned to match the object surface in the photo. In other embodiments, the three-dimensional surface may have curved surfaces, surfaces that are not connected, or surfaces that do not follow the surfaces in the image in order to create the effect of simulating an interaction of artwork and photographic surface.

The grid structure gives feedback to the user to let them know which plane they are interacting with. For example, in one embodiment, the user first pastes the artwork into the three-dimensional surface tool and the artwork appears flat, and is unaffected by the three-dimensional planes. Using the mouse, the user then drags the artwork over one of the surface planes to affect the artwork. FIG. 5 shows artwork 503 placed (as indicated by the cursor arrow) over region 502, which corresponds to the top of the box. In one embodiment, the color of grid 501 changes as artwork 503 is placed over a region, such as region 502. In another embodiment, a user may first select the region (such as region 502), which will change color, then paste artwork 503 directly onto the plane. The software that controls the mapping of the artwork to the three-dimensional plane will then proportionally scale the artwork so that it is as large as possible without it being cropped. Once the scaling has completed, the user may rescale, rotate, distort or edit the artwork as needed. In still another embodiment, the software that governs the three-dimensional structure is able to "know" which artwork layer or layer group the artwork is being pasted into and highlights the corresponding surface plane when the three-dimensional window first appears.

A key component of feedback given during the positioning application of the artwork to the three-dimensional plane is that moving or resizing the artwork with the mouse changes the perspective and surface distortion of the artwork in real time, in accordance with the grid structure, so that the artwork appears to be moved and resized on the surface of the object. The feedback allows a user to more accurately visualize the final appearance of the artwork as it will be after the artwork is approved and applied to the object's artwork layer. In another embodiment an addition to the three-dimensional grid functionality causes the pasted artwork to be automatically, and proportionally scaled to fit the appropriate object face without the need for manual scaling input from the invention's user. In one embodiment the artwork is trimmed by the associated alpha channel or layer mask with the layer group before preview. In this embodiment, the artwork is shown without being trimmed and is trimmed once the user approves the positioning of the artwork.

Moving the pasted artwork from one surface grid to another (for example, region 504) will deselect the current grid and select the new surface grid which will then govern the distortion and perspective of the user's artwork.

Figure 6:
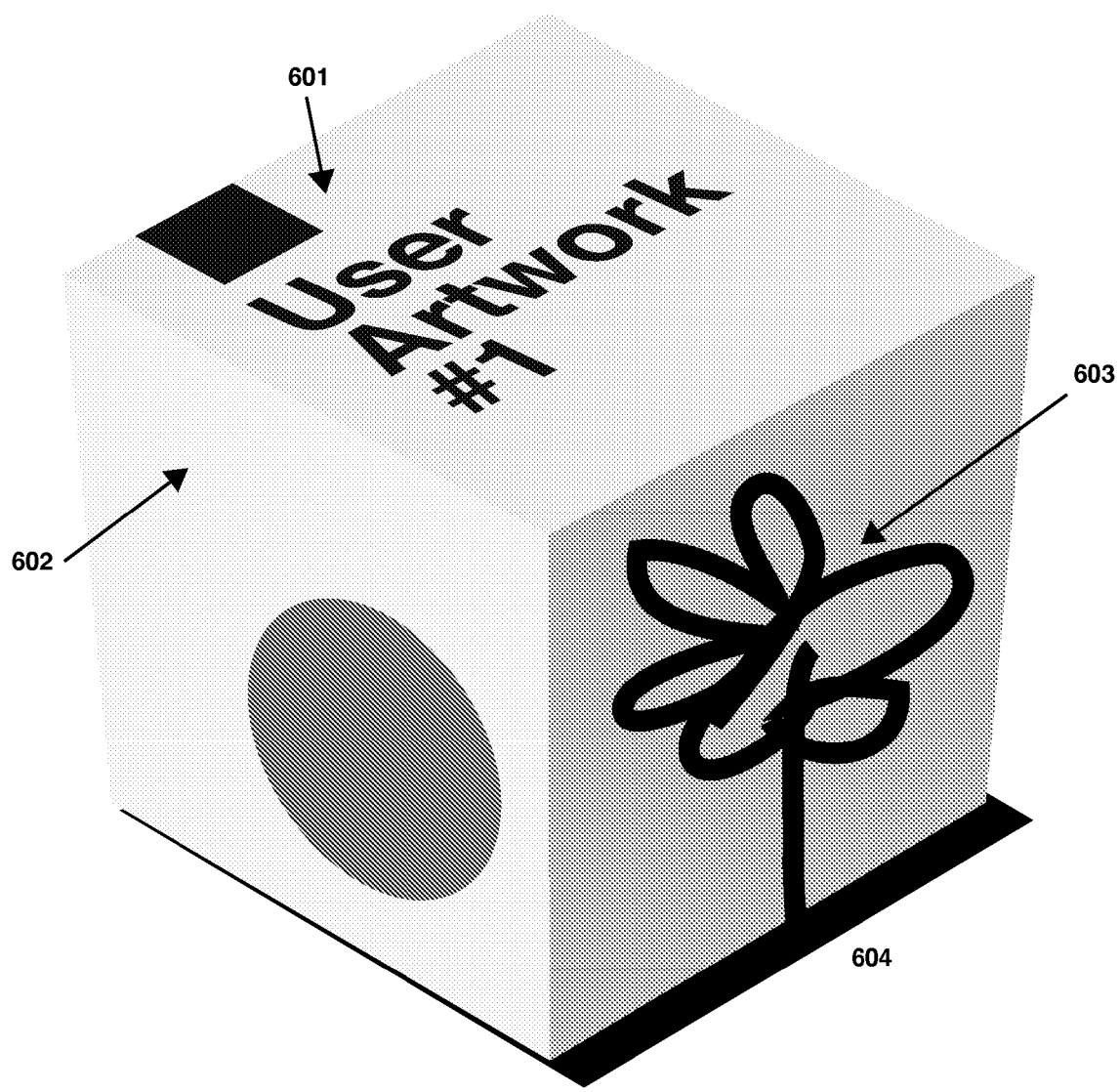
FIG. 6 is a representation of a composited image with user defined artwork.

Referring now to FIG. 6, which is a representation of a composited image with user defined artwork, which may be similar to final composite image 313. The image of FIG. 6 includes three regions (specifically, a top region 601, a left region 602, and a right region 603) and a shadow 604, and illustrates that, in one embodiment an image, such an image of a cube box, can have various types of user defined artwork map to the surfaces of the box to closely mimic an image a cube shaped box with artwork actually printed on it.

The final application of user defined artwork (for example, the artwork depicted on top region 601) realistically simulates the appearance of a real cube with artwork printed on the cube and then photographed. This is because the artwork is cleanly trimmed to the edges of the object face, because it is mapped to a three-dimensional surface which matches the object in orientation and perspective, and because the photographic shading and color of the object image is applied to all underlying layers including the artwork layers.

In areas without user defined artwork, color, or other treatments, such as that depicted on left region 602, the object or scene's image is pure and unmodified because the transparent object or scene image or photograph is overlaid on nothing more than the white "ko" layer. For each non-transparent pixel, the pure white "ko" layer would contain RGB values of (255, 255, 255) and the object image would contain R, G, B values that may vary. When compositing together the final R, G, B values would match those of the object image.

Artwork layers, for example the artwork layer depicted at right region 603, which are floated on a transparent background and thus contain transparency data appear to be printed opaquely on the object surface but will also opaquely print over lower artwork layers, allowing those artwork layers to show through only where the artwork layer's transparency allows for it.

By having the shadow layer stacked below the object image, for example shadow 604, and ko image layers, the shadow cleanly and realistically composites below the opaque object and ko image layers and sits transparently on top of the background image. In another embodiment, such as that depicted in FIG. 10, where the background contains an image or pattern instead of a solid white color, as shown in this embodiment, details of the background image would show through the transparent shadow image as they would with a real shadow.

Figure 7:
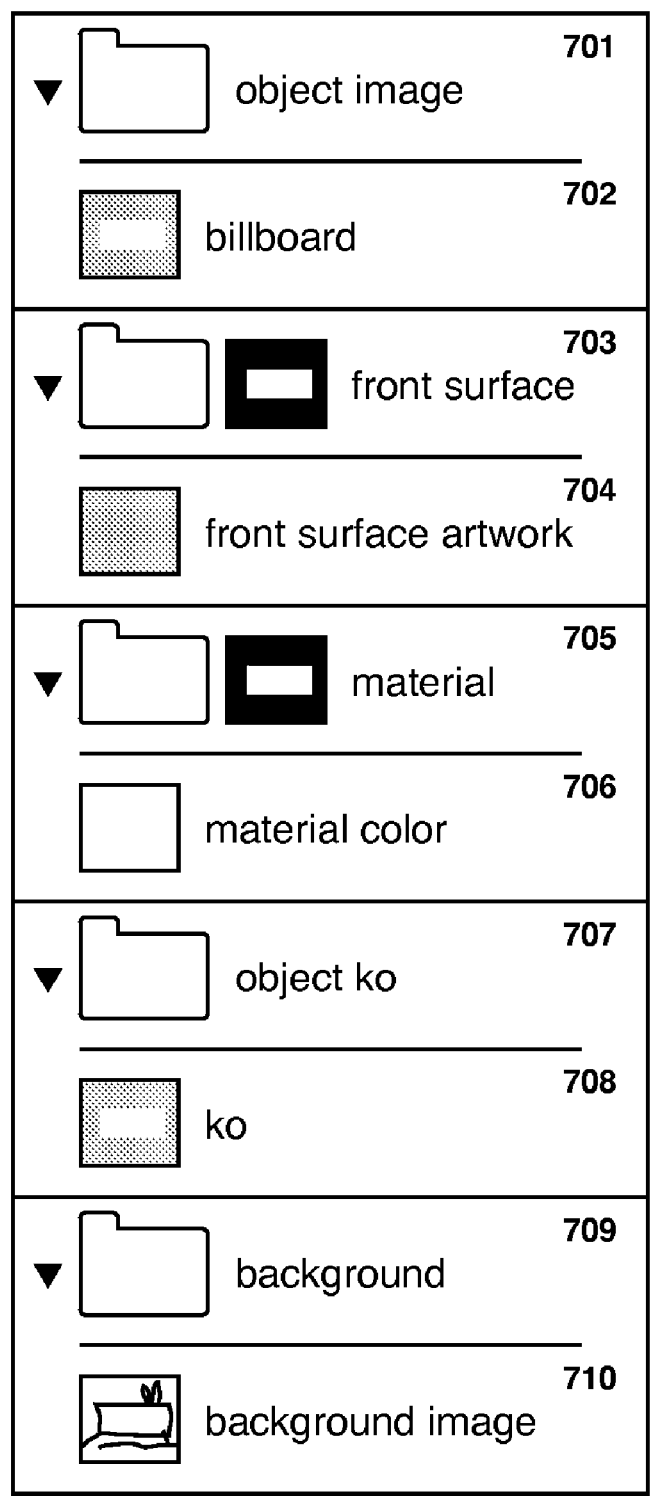
FIG. 7 is a schematic illustration of layers in some embodiments.

Referring now to FIG. 7, which is a schematic illustration of layers of another embodiment, which may be generally similar to the layers of FIG. 2 or 3, and which includes embedded data for an image that includes a billboard. Layer 701 is a "pass through" (allowing both transparent and or opaque layers) layer group which contains layer 702, a "multiplied" (transparent) layer. Layer 702 contains, in this embodiment, a photographic object, in this example a photographic depiction of a billboard, which has been set to "multiply" transparently in order to composite it onto layers 703 through 710 for the purpose of providing context, shading, and the majority of true object or scenic representational photographic data for the final image with transparency values set to isolate each scene's object component from its background. In this embodiment the final rendering will be an outdoor scene with a billboard.

Layer 703 is a pass though layer group and associated layer mask. In this embodiment the layer mask may be used to dynamically "trim" enclosed layer artwork to a single face of a surface belonging to the object depicted in layer 702.

Layer 704 is an artwork layer, with transparency set to normal, that is intended to be user customized and used as a target for pasting in artwork or imagery to be incorporated into the final composited image.

Layer 705 is a multiplied layer group which has been set to multiply in order to avoid pixel-on-pixel lightening in anti-aliased areas, with the goal of cleanly compositing the enclosed normal layers.

Layer 706 is a normal layer which is intended to be user customized and which, because it sits between multiplied layer 702 and normal layer 708, alters the overall surface of the object in the final resulting image. In one embodiment, layer 706 contains an opaque, solid color. In other embodiments, photographic or graphic imagery may used instead of solid color in other to provide an overall texturing effect. In still other embodiments, layer 706 may be left empty so as to keep the object surface unmodified.

Layer 707 is a pass through layer group which contains layer 708. Layer 708 is an layer with transparency set to normal which serves as an opaque or partially opaque mask in order to hide or obscure overlapped pixels on layers 709-710 and which, in this embodiment, contains a solid color which is white in appearance and has a color value 255, 255, 255, respectively. In other embodiments layer 707 may contain multiple layers like layer 708, each with corresponding shape and form attributes that mimic the respective layers contained in the layer group at layer 701, with corresponding transparency data attributes that approximate the true transparency of the objects or scenes contained in the respective layers contained in the layer group at layer 701, and with corresponding edge data that closely visually mimics and closely matches the edge data from respective layers contained in the layer group at layer 701.

Layer 709 is a pass through layer group which contains layer 710. Layer 710 is a normal artwork layer which, in this embodiment, contains continuous tone graphic or photographic image data, for example a photograph of a scene with the image of the billboard itself removed and place in layer 702.

Figure 8:
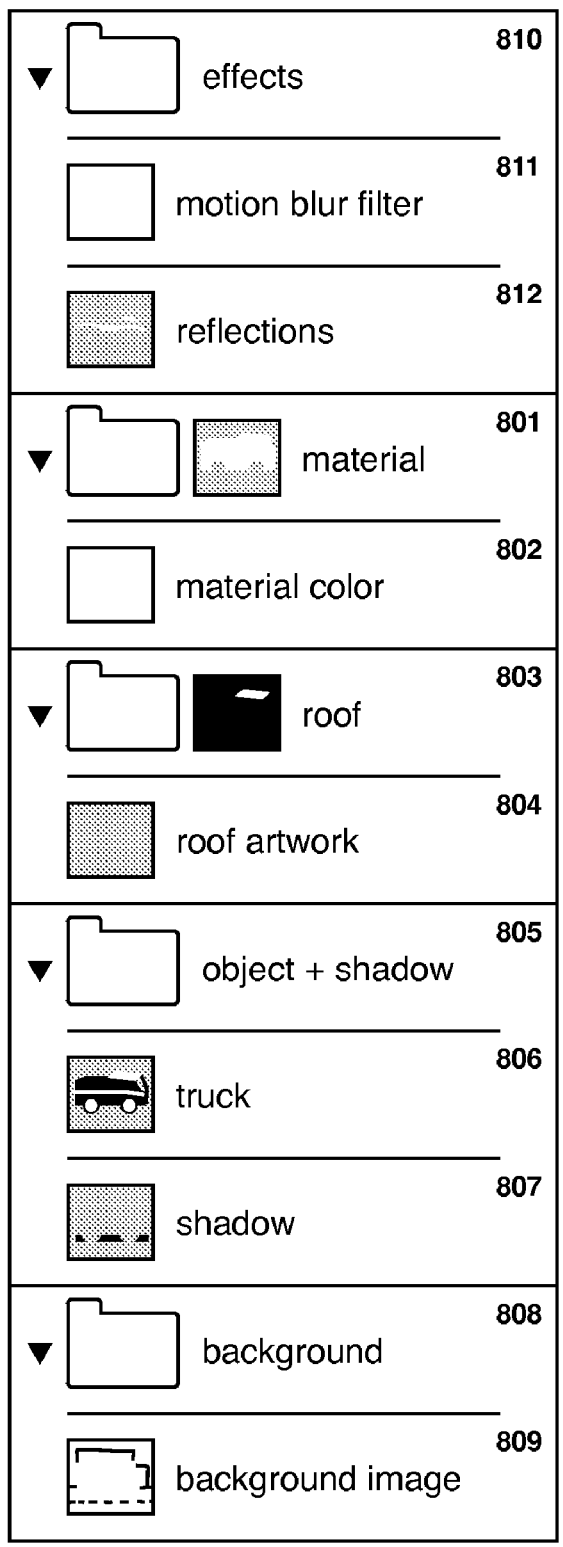
FIG. 8 is a schematic illustration of layers in some embodiments.

FIG. 8 is a schematic illustration of layers of another embodiment, which may be generally similar to the layers of FIG. 2, 3, or 7, and which includes embedded data for an image that includes a truck. which is a schematic illustration of layers in some embodiments; layer 810 is a pass through layer group at containing motion effects layer 811 and partially opaque layer 812.

Layer 811 is an effects layer, in this embodiment being a motion blur effects layer, which renders a pre-specified motion blur to the final composite or composite preview of the lower layers automatically after each change to the image content of the layers. So, for example, if artwork is applied to layer 804 and the resulting image before application of artwork is a slightly blurred truck without artwork on its roof, then after application of the artwork the resulting image would automatically recalculate and re-render to be a slightly blurred truck with blurred artwork on its roof. Effects layer 811 is not limited to motion blurs and in other embodiments may take the form of any one of a numerous imaging effects: for example, "glow", "invert", "color tint", "texturize", etc. In still other embodiments, effects layer 811, may be a "layer style" within an image editing application (for example, Photoshop) layers palette. In still other embodiments, the effects layer may not be contained within a layer group. In still other embodiments the effects layer may be an integrated component or rendering step within a self-contained application or the effects layer may be a rendering step that is only represented in how it affects the final composite image and not represented as a visual part of the graphical user interface.

Layer 812 is a partially opaque layer at which contains, in this embodiment, an image of the highlights (bright, accented, or reflective areas) of the image which because they are on an upper layer are superimposed on imagery contained on lower layers during compositing/rendering. Layer 812, in this embodiment, contains highlight image data which may be created by hand isolating it from the original source image or, alternatively, hand created and based on the original source image used to create the file. Layer 812 may also give a lightening effect to lower layers as opposed to the transparent object image in most embodiments which gives a shading effect to lower layers.

Layer 801 is a multiplied layer group at which has been set to multiply in order to avoid pixel-on-pixel lightening in anti-aliased areas, with the goal of cleanly compositing the enclosed normal layers, and which contains normal opacity layer 802 which is intended to be user customized. Layer 802 alters the overall surface of the object in the final resulting image as well as layers 803 and 804 because it sits on top of layers 803 though 809. In one embodiment, layer 802 contains an opaque, solid color. In other embodiments, photographic or graphic imagery may used instead of solid color in other to provide an overall texturing effect. In still other embodiments, this layer may be left empty so as to keep the object surface unmodified.

Layer 803 is a transparent layer group and associated layer mask which, in this embodiment, may be used to dynamically "trim" enclosed layer artwork to a portion or single face of the surface belonging to the object depicted in layer 806 and which, in this embodiment, have layer transparency set to be "multiplied" in order to give an ink effect to artwork layer 804 which simulates transparent ink. Layer 804 has transparency set to normal as it is intended to be user customized and used as a target for pasting in artwork or imagery to be incorporated into the image.

Layer 805 is a pass through layer group containing transparent layer 806 which contains a photographic image of an object, in this example a depiction of a truck which has its layer transparency attributes set to be opaque in order to composite it onto layers 807 though 809 for the purpose of providing true object or scenic representational photographic data for the final image. In this embodiment the final rendering will be an outdoor scene with a truck.

Layer 807 is a transparent layer with shadow data that contains shadow image data with transparency data, where the shadow data goes from solid or partially transparent in darker shadow areas to completely transparent in the lightest shadow areas. Layer 807 is set to have its shadow image data overlap the outer edge of the artwork or image in layer 806 by 1 pixel in order to avoid having any visual gaps between the image in layer 806 and the shadow image on layer 807.

Layer 808 is a pass through layer group which contains normal layer 809 which, in this embodiment, contains a continuous tone graphic or photographic image with the image of the used surface, in this example a truck, removed and moved to layer 806.

Figure 9:
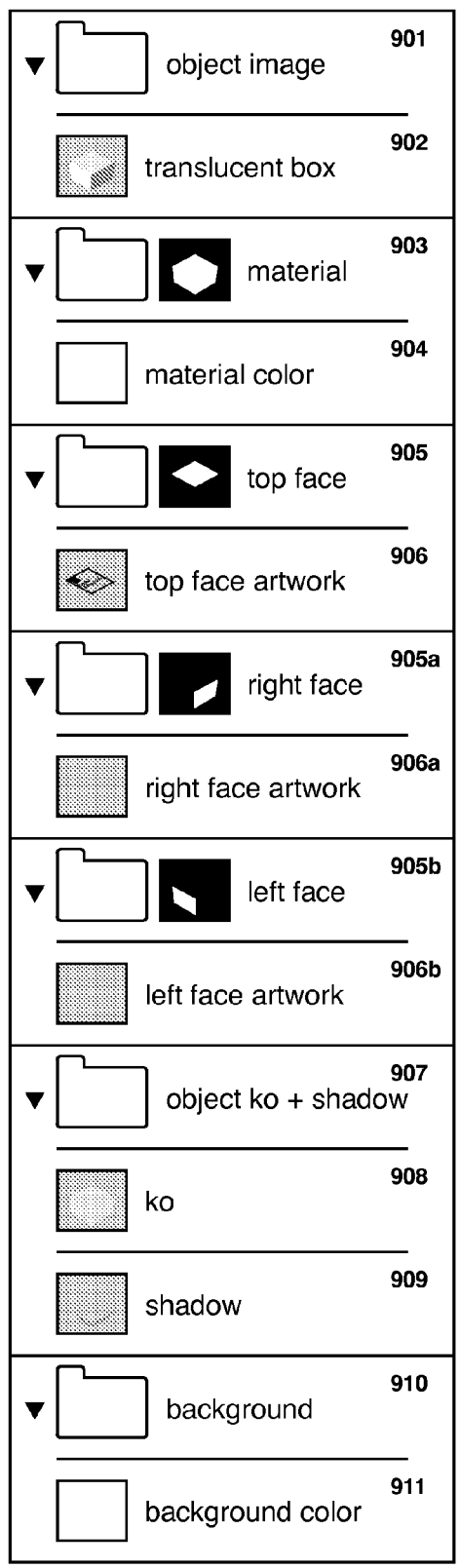
FIG. 9 is a schematic illustration of layers in some embodiments.

Referring now to FIG. 9, which is a schematic illustration of layers in some embodiments, layer 901 is a pass through (allowing both transparent and or opaque layers) layer group which contains a "Multiplied" (transparent) layer, found at layer 902. Layer 902 contains, in this embodiment, a photographic depiction of the object which has been set to "Multiply" transparently in order to composite it onto layers 903 through 911 for the purpose of providing context, shading, and the majority of true object or scenic representational photographic data for the final image, with transparency values set to isolate each scene's object component from its background.

Layer 903 is a transparent layer group at which has been set to Multiply in order to avoid pixel-on-pixel lightening in anti-aliased areas, with the goal of cleanly compositing the enclosed normal layers.

Layer 904 is an opaque layer which is intended to be user customized which, because it sits between transparent layer 902 and semi-opaque layer 908 alters the overall surface of the object in the final resulting image. Opaque layer 904 sits above layers 905, 906, 905a, 906a, 905b, and 906b and thus affects not only the overall material color of the object depicted at layer 902 but also the artwork contained on layers 906, 906a, and 906b in order to give the artwork the look of being printed on a translucent material. In this embodiment, layer 904 contains an opaque, solid color.

Layer 905 is a pass though layer group at with an associated layer mask which has been designed to contain all enclosed layers to a boundary area within the object image depicted in layer 902. In this embodiment the layer mask may be used to dynamically "trim" enclosed layer artwork to a single face of a surface belonging to the object depicted at layer 902. Whereas each following associated layer mask (such as layer 905a and layer 905b) shall trim enclosed artwork layers and the artwork they contain to its respective face.

Layer 906 is an opaque artwork layer that is intended to be user customized and used as a target for pasting in artwork or imagery to be applied to the image. The user may, during the use of these artwork layers, modify the transparency settings to be transparent in order to achieve various ink effects.

Layers 905a, 906a, 905b, and 906b are additional pass through layer groups and artwork layers with associated alpha channel masks. In this embodiment, these are used to constrain each group's layers, and the artwork pasted into these layers, to the top, left, and right faces, respectively.

Layer 907 is a pass through layer group containing layer 908, A semi-opaque/semi-transparent layer which serves as a partially opaque mask in order to hide or mask out overlapped pixels on layers 909-911 and which, in this embodiment, contains a solid color which is white in appearance, and has a color value 255, 255, 255, respectively, with an overall opacity of 30%. Layer 908 also contains transparency data that estimates the true transparency of the object depicted in layer 902 with edging defined by transparency data that closely visually mimics and closely matches the edge data from, in this embodiment, the layers contained in layer group 901.

Layer 909 is a transparent layer with shadow data that contains shadow image data with transparency data where the shadow data goes from solid or partially transparent in darker shadow areas to completely transparent in the lightest shadow areas.

Layer 909 is set to have its shadow image data overlap the outer edge of layers 902 and 908 by 0 pixels in order to avoid having any visual overlap between the shadow image on shadow layer 909 and the semi-transparent ko layer 908 or object image in layer 902.

Layer 910 is a pass through layer group containing layer 911, which is an opaque layer which, in this embodiment, contains a filled solid color with RGB values 255, 255, 255, respectively.

Figure 10:
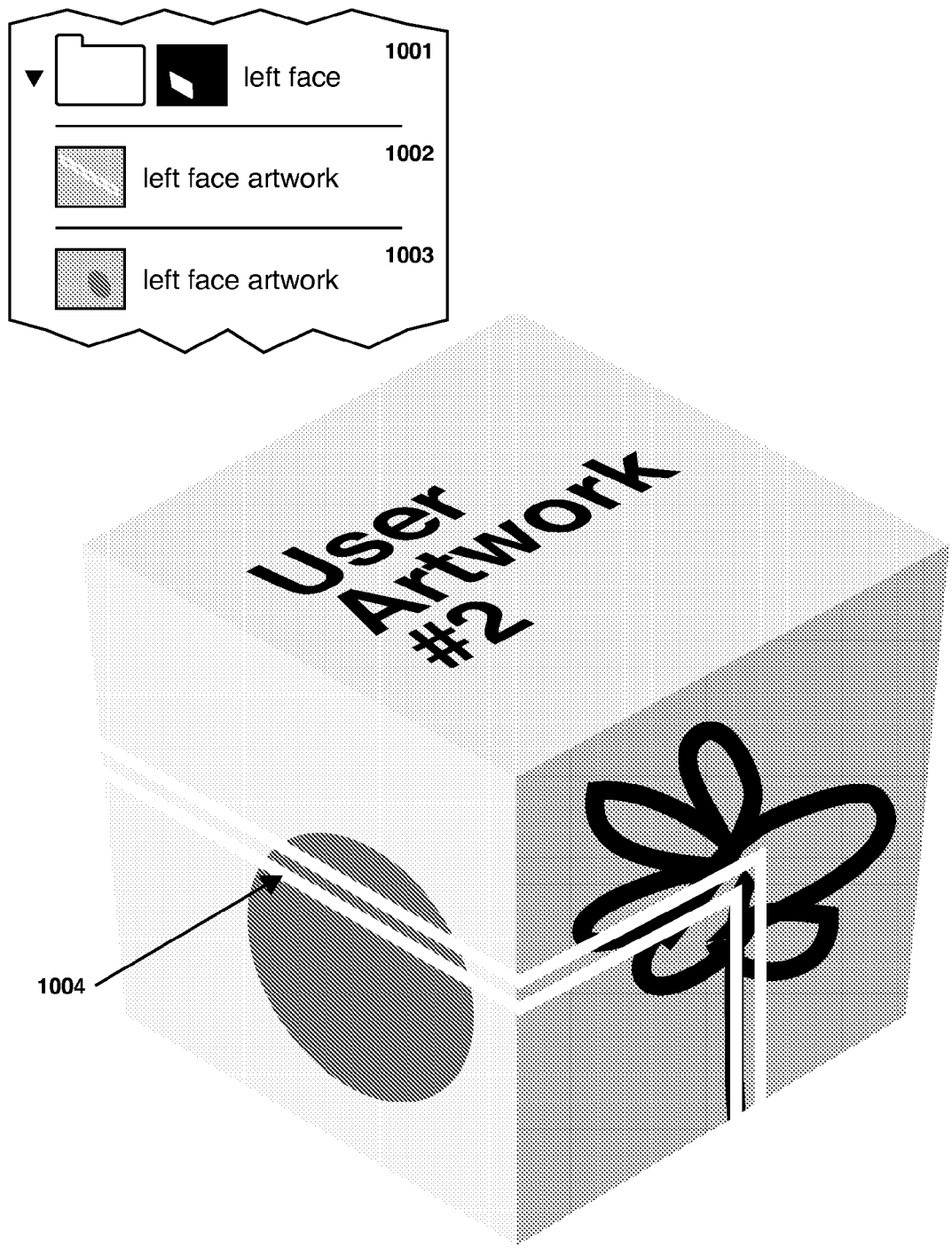
FIG. 10 is a representation of a final composited image with user defined artwork.

Referring now to FIG. 10, which is a representation of a final composited image with user defined artwork, layer 1001 is a pass though layer group with an associated layer mask which, in this embodiment is used to dynamically "trim" enclosed artwork to a single face of a surface belonging to the object depicted in FIG. 10.

Layer 1002, in this embodiment, is an opaque artwork layer that is intended to be user customized and used to house artwork or imagery which has been pasted into the artwork layer in order to be applied to the image. In this embodiment, layer 1002 contains an example of user created artwork: an opaque set of lines on a transparent background. In other embodiments layer 1002 may contain numerous user artwork of unknown classification and design.

Layer 1003, in this embodiment, is an opaque artwork layer that is intended to be user customized and used to house artwork or imagery which has been pasted into the artwork layer in order to be applied to the image. In this embodiment, layer 1003 contains an example of user created artwork: an opaque circle on a transparent background. In other embodiments layer 1002 may contain numerous user artwork of unknown classification and design.

A depiction found at 1004 which indicates how layers 1001, 1002, 1003, and other layers, which are not shown, composite to build a final image. In this embodiment, artwork layers are floated on a transparent background (i.e. contain transparency data) and thus appear to be printed opaquely on the object surface but will also opaquely print over lower layers, allowing superior layers to obscure the pixel data on lower levels where the superior levels have opaque pixel data, while showing through pixel data from lower levels where the superior levels have an absence of opaque pixel data and thus transparent pixels or a transparent field.

Figure 11:
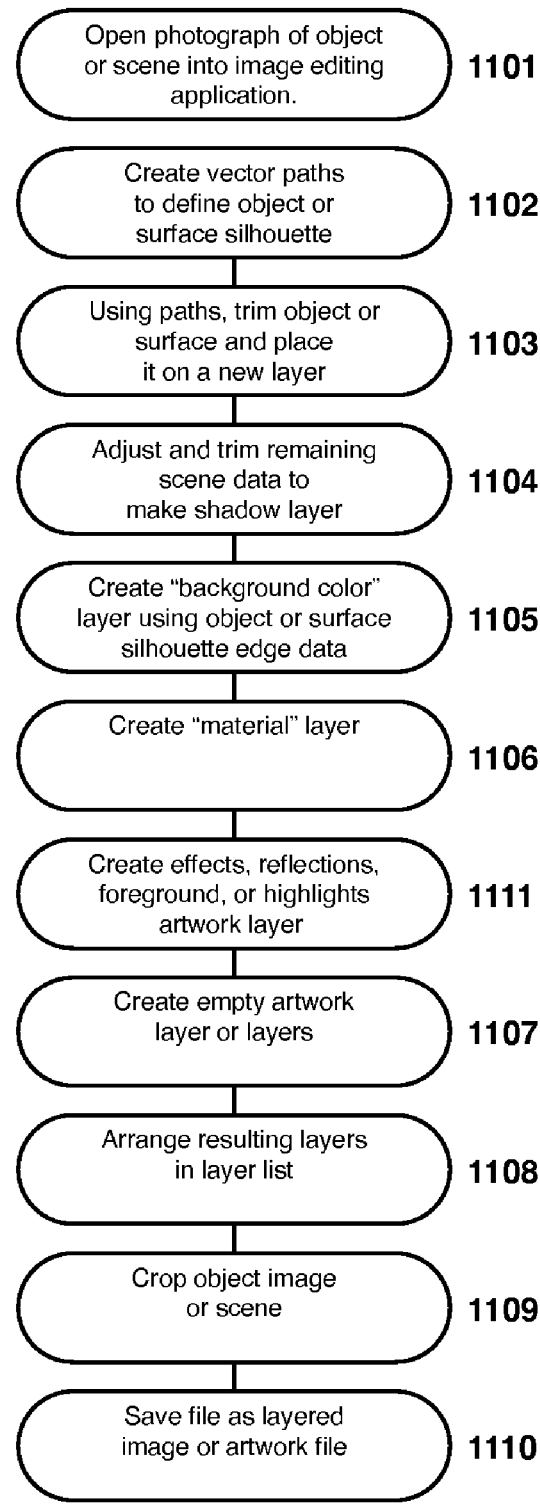
FIG. 11 is a representation a method for building an image with embedded surface data from a photographic image.

Referring now to FIG. 11, which is a representation a method for generating an image with embedded surface data from a photographic image. The method commences at block 1101 with first digitally photographing the object or traditionally photographing and then scanning in the image of the object. The resulting digital image is then loaded into an imaging editing application.

Vector Bezier lines (or "Paths") are drawn to define the edge of the object at block 1102. After the silhouette of the object has been drawn it is saved as one complete path. The layering of additional objects will require repetition of the process for each object.

The path that defines the object is used to mask and trim out the object from the image and paste it in place on a new image layer at block 1103 and the object layer's transparency is set to "Multiply" so that it will be transparently composited with the image or color data on lower layers.

The remaining background data is then cleaned up using image editing tools at block 1104. This is generally done by increasing the contrast of the image. Any remaining spot cleanup can then be done to fix shadow details or spot out dirt and other non-white data in the white area through the use of image editing tools. With the object visible on a superior layer, the shadow is reduced in scale by about 5% so that it remains aligned with the object. The shadow is then trimmed from its surrounding image using a path drawn to enclose the shadow area without cutting any of it off, then the path which silhouettes the object is used to trim the shadow mask area so that the resulting shadow path does not include any object image. The shadow image is then cut out put into a new layer titled "shadow". This effectively trims the shadow so that its pixels sit adjacent to the object image pixels. The "shadow" layer's transparency is set to "Multiply" so that it will be transparently composited with the image or color data on lower layers. A similar technique can be applied to the images of other layers by extending them so that they appear to be adjacent or beneath to the artwork.

A new layer is created and a solid white fill color is used to fill the layer with edge-to-edge white color at block 1105. As in block 1104, a trimming area is made by using the object silhouette path as defined in block 1102. This selection area is then removed from the white fill area, leaving a transparent hole in the white fill which precisely matches the silhouette and position of the object. This layer is titled "background color" (the title here indicates how the layer affects the final image composite and not its position in the layer list) and is set to be opaque or "Normal" so that no visible image information from lower layers will appear on the final composite.

A new layer is created and titled "material" at block 1106. The color of the material layer is set to be edge-to-edge white and the transparency of the "material" layer is set to "Multiply" so that when the color of the material layer is altered, by the invention's user, the color data information will tint the object and artwork in the final image composite and so that any transparency of the object will be maintained.

In this embodiment, a new layer or layer group is created which is titled "highlight" at block 1111. First, artwork is extracted which represents the lighter areas of the image. To do so, contrast enhancement, similar to that used at block 1104, is used but for the purpose of capturing light areas instead of shadow areas. The resulting image is cleaned and trimmed using a combination of path and selection tools. A blur is applied to soften the edges of the highlight. Finally, the highlight is trimmed to fit inside the appropriate object, face, or surface (in this case the bottle image) by alt or command-clicking on the respective layer (for example, at layer 1203 in FIG. 12), inverting the selection to select everything except for the bottle, and then trimming away the excess by deleting it. Finally, the highlight layer opacity is set to be 30% to make the layer partially opaque. Other embodiments may contain any combination of layers, each containing an effect (such as the motion blur of a moving automobile, the glow achieved by the use of a soft-focus lens, a color tint, or texture), reflection (such as the room environment on a glass bottle), foreground imagery (such as wires and telephone poles in a scene of a billboard), and highlight, as previously mentioned.

One or more artwork layers are created as a space for the user to place their artwork at block 1107. Later, at the discretion of the user, the apparatus may be modified to include more layers or to include layer masks for the artwork layers.

Figure 12:
FIG. 12 is a schematic illustration of layers in some embodiments.
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:
Figure 12:

Once all layers have been built, each layer's transparency settings are reviewed and arranged in the order at block 1108, in this embodiment as depicted in FIG. 12.

The image and set of layers are cropped or repositioned as needed at block 1109.

In this embodiment, the file may be saved as a layered image file at block 1110 (for example, a layered Photoshop native file) so long as the format maintains the embedded layers and does not flatten the image. In another embodiment, the file is saved as a layered TIF file.

Referring now to FIG. 12, which is a schematic illustration of layers in some embodiments, the schematic shows layers both before (at layers 1201) and after (at layers 1208) user customization.

Layers 1217 and 1218 are partially opaque layers containing, in this embodiment, an image of the highlights (bright, accented, or reflective areas) of the image at layer 1210 which generally have a lighter color or white (RGB=(255,255,255)) fill color. Because layers 1217 and 1218 are on an upper layer are superimposed on imagery contained on lower layers during compositing/rendering. The image in layers 1217 and 1218 may be hand isolated from the original source image or, alternatively, hand created and based on the original source image used to create the apparatus. In this embodiment, layers 1217 and 1218 gives a lightening effect to lower layers as opposed to the transparent object image on layers 1203 and 1210 in most embodiments which gives a shading effect to lower layers.

Layers 1202 and 1209 are transparent layers with shadow data that contains shadow image data with transparency or masking data that is masked in order to have its shadow image data precisely butt up against image data in layers 1203 and 1210 respectively.

Layers 1203 and 1210 are "multiplied" (transparent) layers which contain, in this embodiment, a photographic depictions of the object which have been set to "multiply" transparently in order to composite onto layers 1204-1207 and layers 1211-1218 respectively for the purpose of providing context, shading, and the majority of true object or scenic representational photographic data for the final image with masking and transparency data set to isolate each scene's object component from its background.

Layers 1204 and 1211 are opaque layers which serve as opaque or partially opaque masks in order to hide or block overlapped pixels on lower layers such as layers 1205 though 1207 and layers 1212 though 1218 respectively. In this embodiment, layer 1204 and layer 1211 contain a solid color which is white in appearance, and has an RGB color value of 255, 255, 255, respectively. Layers 1204 and 1211 are masked to opaquely obscure the image data on layers 1205 through 1207 and layer 1212 through 1216 respectively except for that which underlies the silhouetted shape of the object at layers 1203 and 1210. Should there be transparency or opacity attributes in the object images at layers 1203 and 1210, they should be reflected in layers 1204 and 1211 respectively. For example, if the object image at layer 1203 depicts a purely opaque object then layer 1204 would be a solid fill, in this example a solid color, with an object silhouette having 0% opacity. However, if the object image at layer 1203 instead depicts an object with 70% opacity then layer 1204 would be a solid fill, again in this example a solid color, with an object silhouette having 30% opacity. In other embodiments, layers 1204 and 1211 may contain solid color or photographic data while continuing to contain masking or transparency data that closely visually mimics and closely matches the opacity and object edge of the object depicted at layers 1203 and 1210.

Layers 1205, 1212, 1213, and 1214 are opaque artwork layers that are intended to be user customized and used as a target for pasting in artwork or imagery to be applied to the image. The user may, during the use of these artwork layers, modify the masking settings as in layer 1214, create additional layers as in layers 1212 through 1214, or modify the transparency settings of any of the layers in order to achieve various layering and ink effects. In other embodiments, user customizable artwork layers, such as layers 1212, 1213, and 1214, may, without user customization, contain vector or alpha masks, in the same manner that other embodiments of the invention previously mentioned contain layer groups with vector or alpha channel based layer masks.

Layers 1206 and 1215 are opaque layers which, in one embodiment, have a filled solid color with RGB values 255, 255, 255 respectively.

Figure 13:
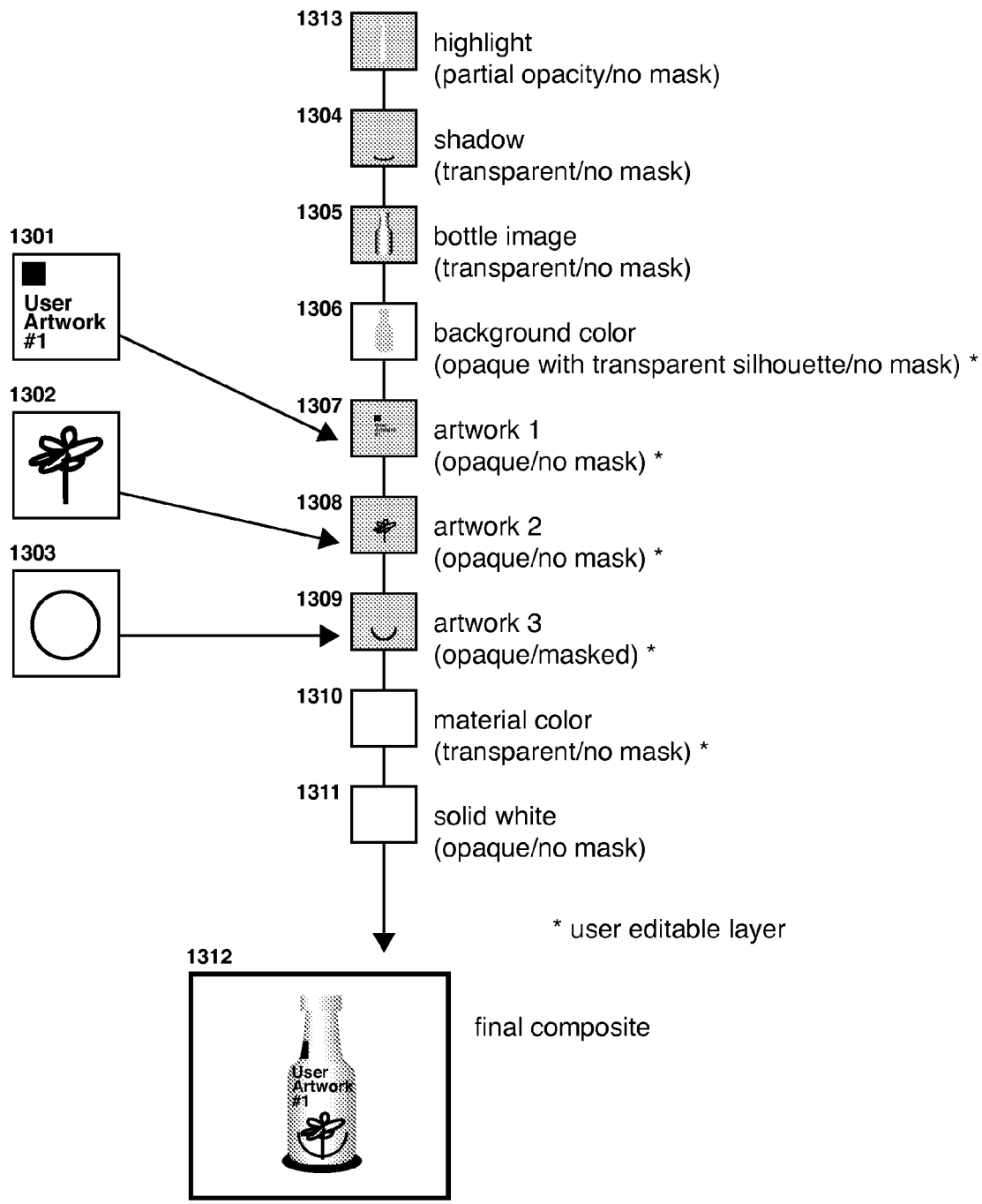
FIG. 13 is a representation of the flow of image data to provide a final composite image.

Layers 1207 and 1216 are opaque layers which, in one embodiment, have a filled solid color with RGB values 255, 255, 255 respectively Referring now to FIG. 13, which is a representation of the flow of image data to provide a final composite image. User artwork 1301, 1302, and 1303 may be created in a vector or raster image format, and is first sized using proportioning guidelines that are supplied as numeric dimensions or as visual shapes which mimic the proportion of each object surface. The correctly proportioned artwork is then exported or "copied" from the source in which it was created and then imported or "pasted" into the artwork layers, in this embodiment at layers 1307-1309. In this embodiment, the vector artwork images contain transparency data so that the artwork "floats" on a transparent background. In other embodiments, the artwork data may contain no transparency data.

The "highlight" image layer 1313 which contains isolated highlight portions of the image depicted in layer 1305 and serves to lighten lower layers, including user artwork layers 1307-1309, by having partially opaque white or light, or in one embodiment, transparent "Screened" layer attributes in Photoshop. The highlight layer is not considered a user customizable layer. It is a partially opaque layer or transparent "Screened" layer which is not masked.

The "shadow" image layer 1304 is not considered a user customizable layer. However, the invention's user may choose to customize any component as, in this embodiment, all of the layers are editable. One example of user customization might be as simple as changing the opacity of the shadow image in order to lighten its appearance on the background. The shadow image is a transparent layer called "shadow" which is masked to exclude everything on the layer but the shadow and the white background that it sits on.

The object image layer 1305 is not considered a user customizable layer. However, the invention's user may choose to customize any component as, in this embodiment, all of the layers are editable. The object image is a transparent layer and its layer group folder is unmasked.

The background color layer 1306 may be left as the default white shade. Should the invention's user wish to customize the appearance of the background in the final composited image this layer may be filled with imagery, pattern, or solid color. The background color is considered a user customizable layer. Its layer is masked to exclude the silhouetted shape of the object at layer 1305.

Artwork layers 1307, 1308, 1309, are intended to be user customized with artwork and are intended to receive user artwork for each respective object surface. In some embodiments, vector or alpha channel based masks trim the artwork layers at layers 1307, 1308, and 1309 and trim the user artwork before superimposing it transparently, opaquely, or a partially opaquely, over lower layers, represented by layers 1310 and 1311.

The "material color" layer 1310 may be filled with imagery, pattern, or solid color. The material color layer is considered a user customizable layer. Layer 1310 is an opaque layer which is not masked.

The "solid white" layer 1311 is filled with a solid color having RGB values 255, 255, 255, respectively. The solid color layer is not considered a user customizable layer. Layer 1311 is an opaque layer which is not masked.

To display a final composite image, as depicted as image 1312, layers 1304-1311 follow their respective masks and transparency settings in order to do the math to create a single image. In this example, the final composite image appears inside the image editing application (for example, Adobe Photoshop) while the layers remain separate editable elements. In other embodiments, the final composite image may be a flat, non-editable image created by flattening layers 1304-1311.

Figure 14:
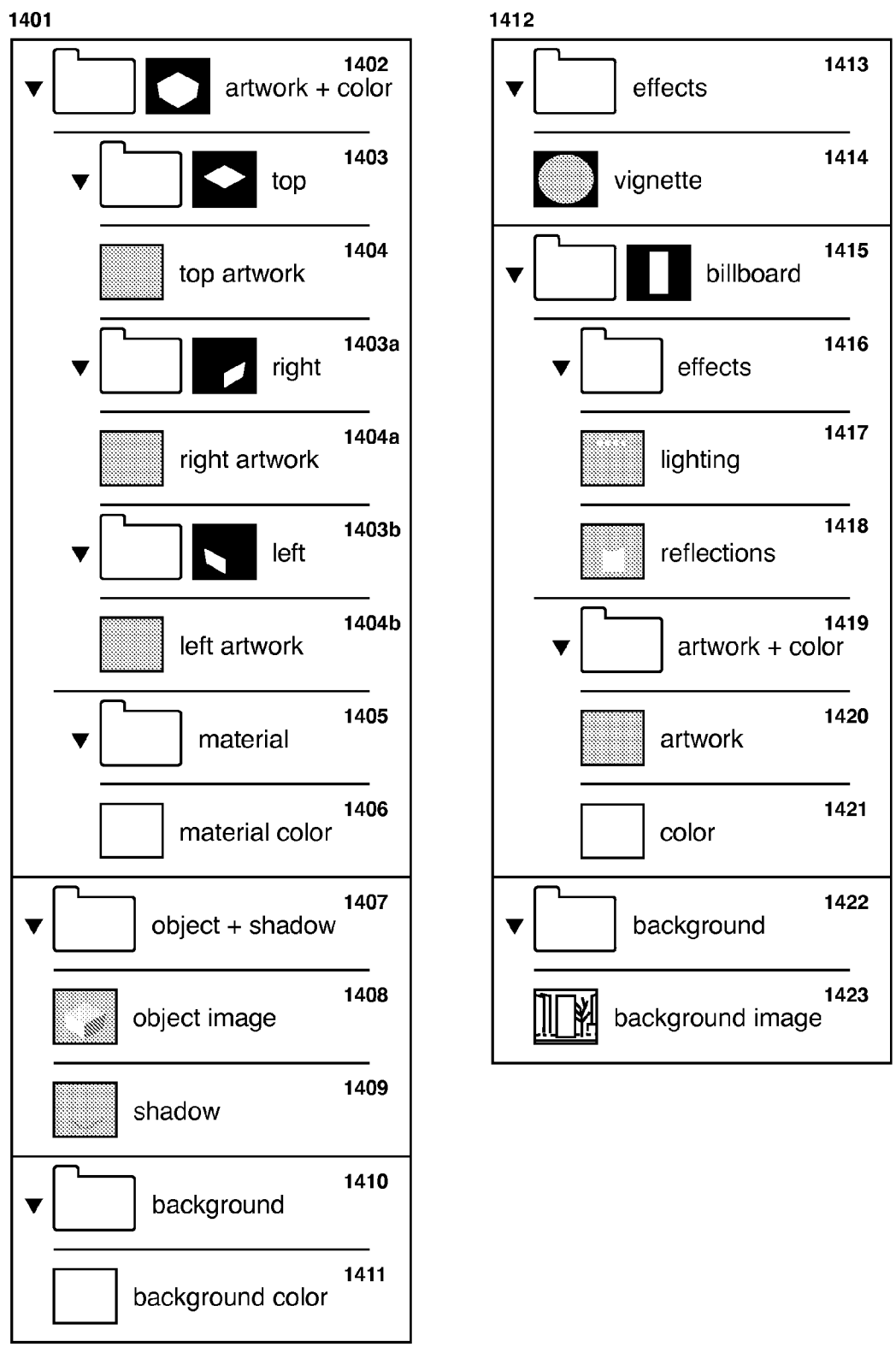
FIG. 14 is a schematic illustration of layers in some embodiments.

Referring now to FIG. 14, which is a schematic illustration of layers in some embodiments, the schematic shows layers for a cube image (at layers 1401) and an outdoor billboard (at layers 1412); layer 1402 is a transparent layer group and associated layer mask which, in this embodiment, is used to dynamically "trim" enclosed layer groups to cleanly match the surface belonging to the object depicted in layer 1408 and which, in this embodiment, have layer transparency set to be "multiplied" in order to allow the surface details and shading of the object in 1408 to shade the artwork superimposed on it. Layer 1402 contains pass through layer groups 1403, 1403a, 1403b, 1405. Each pass through layer group contains an opaque artwork or color layers 1404, 1404a, 1404b, 1406. Layer 1407 is a layer group which contains an opaque object image on a transparent background 1408 and a semi-transparent to transparent shadow on a transparent background 1409. Layer 1410 is a layer group containing an opaque color (in this example solid white) or in another embodiment an opaque photographic image 1411. Layer 1413 is a pass through layer group containing a multiplied transparent black edging which smoothly blends into a transparent circular center in order to emphasize the center of the final image. Layer 1415 is a transparent layer group and associated layer mask which, in this embodiment, is used to cleanly mask it's enclosed pass through transparency layer groups (1416 and 1419) and their respectively enclosed layers, 1417, 1418 which are semi-opaque screened transparency artwork layers and 1420, 1421 which are opaque user artwork and user color layers, onto the opaque background image 1423 enclosed in opaque layer group 1422.

In one embodiment, the guidelines are used as follows. Sizing guidelines, such as those of FIG. 14, are used to apply artwork to the left face of a three-dimensional photographic cube such as the embodiment represented in FIG. 5, the invention's user would simply place their artwork inside the region of the square titled "left" (for example, FIG. 14 at layer 1402). The apparatus would immediately "see" (by calculating a change using a difference algorithm) that artwork vector object(s) or artwork pixels have changed within the region at layer 1402. In another embodiment, the invention's user would cue the apparatus to apply the artwork using a graphical user interface device such as a clickable button. In both cases, the apparatus would apply the artwork by first proportionally enlarging or reducing the scale of the artwork to match the size of the three-dimensional objects face (with, in this embodiment, the edge of the square representing the edges of the object face), applying it to an artwork layer such as the one found at layer 204b in FIG. 2, and render a composite image. In the earlier embodiment, any user alterations to the artwork inside the region would cause the apparatus to, by repeating the herein mentioned process, automatically update the artwork on the face and re-render the composite image.

Figure 15:
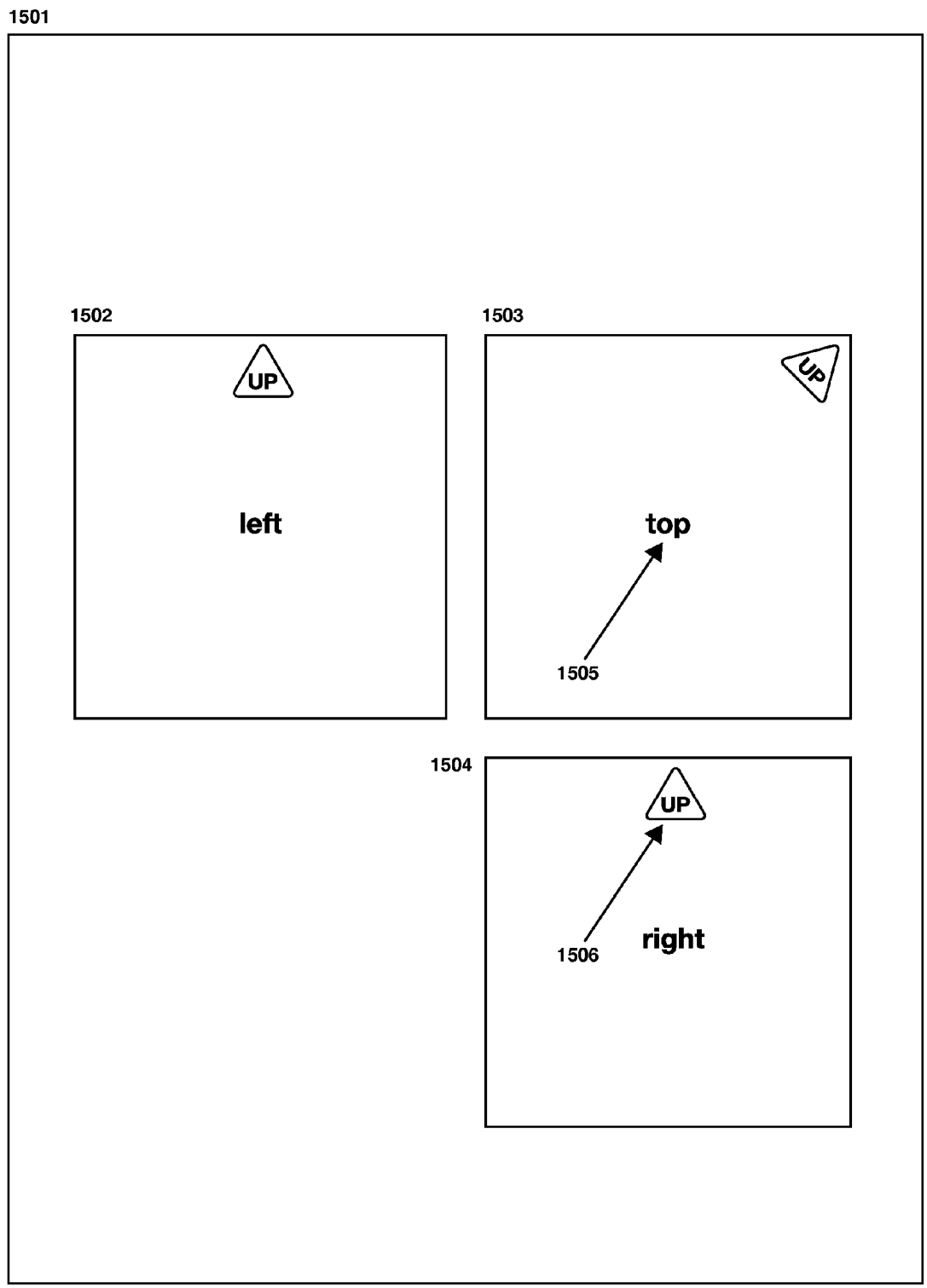
FIG. 15 illustrates the proportional sizing guideline portion of a file which may be used to prepare artwork for use with the apparatus depicted in FIG. 5.

Referring now to FIG. 15, which illustrates the proportional sizing guideline portion of a file which may be used to prepare artwork for use with the apparatus depicted in FIG. 5

In one embodiment, sizing guidelines 1501, which are either an integrated layer or an entirely separate file from the image file, function to aid in the scaling of user created artwork so that it is proportional to each respective object or scene face or surface. Guidelines 1501 include left guidelines 1502, top guidelines 1503, and right guidelines 1504. In this embodiment the apparatus is a vector art file (for example, an Illustrator file) having US letter size edge dimensions of 8.5 by 11 inches. This size is frequently used because it is a common printing size.

As detailed at block 117 each shape (in this example squares), depicted as guidelines 1502, 1503, and 1504 is created by first drawing a vector or image based measurement grid and applying it to each object face or surface of the associated object or scene image in order to accurately judge the proportional size, or relative X and Y dimensions, that artwork must have in order to scale edge-to-edge. The measurements are then used to create a single page group of outlined shapes which match the proportions of each face measured. For instance, if a face is measured to be 10 units wide and 5 units high and the face is a rectangle with square edges, then the shape should be drawn as if viewed from a pure front view. In this case a simple square is drawn with a width of 2 units and a height of 1 unit or similarly, with a width of 20 units and a height of 10 units. If other faces are measured and drawn on the same page then it is important that these faces must be using the same scale. In other words, if, using the above example the square is drawn to 20 by 10 units, if the next face is measured to be 3 wide and 5 high the next square drawn would be drawn at 6 wide and 10 high. The absolute size of the shapes is usually based on the size needed to fit it and other shapes onto a page. In other embodiments, other shapes may be used. For instance, if the shape represents a circular surface, such as the surface of a CD or DVD, then the shape would be a circle and if the surface is irregular then the shape would be drawn to best reflect that irregular shape as viewed from a pure front view. A label is placed inside each shape (e.g. label "top" 1505) so that that a user may clearly associate each shape with the face or surface it represents on the target image. Because a 3D surface or object face is represented here as a series of shapes (in this example squares), an indication is given (e.g. indication "up" 1506) as to the orientation the artwork will have once applied and rotated to fit on the object or surface face. Once all surfaces have been measured and drawn to scale the page should be saved in either vector format, such as Illustrator, or high-resolution raster (bitmap) format to maintain its precision. The invention's user may then later use the sizing guideline apparatus to build their artwork before copying it or exporting it to the image apparatus.

Figure 16:
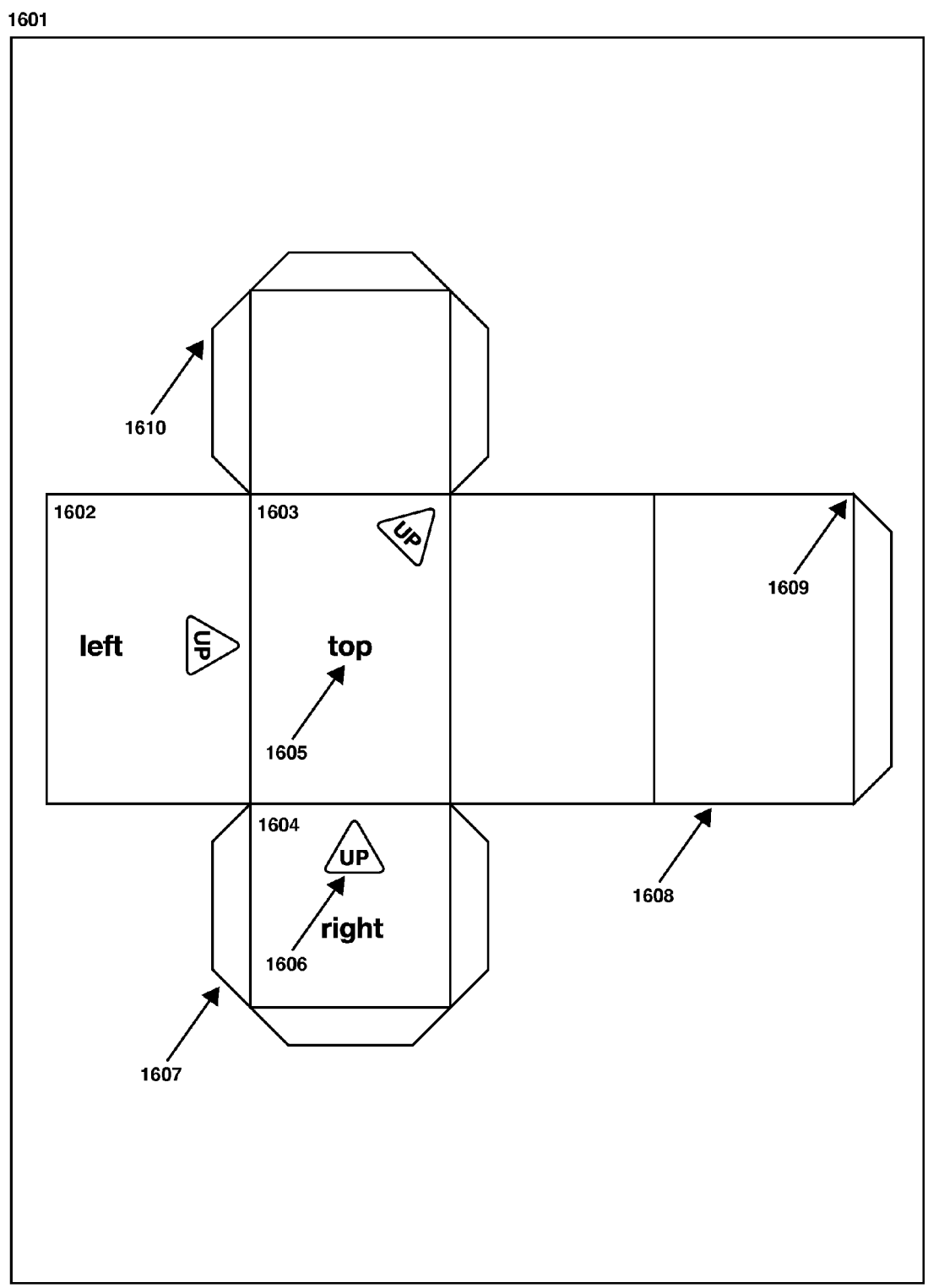
FIG. 16 illustrates the proportional sizing guideline portion of a file which may be used to prepare artwork for application to an image file with embedded surface data as well as prepare artwork for printing.

Referring now to FIG. 16, which illustrates another embodiment of the proportional sizing guideline.

In this embodiment, the sizing guidelines are drawn to be used for a wide rectangular box which is sealed by end caps on the right face and the face which opposes the right face. Edge guides 1602, 1603, and 1604 are similar to those in FIG. 15 but differ in proportion, due to the fact that the object represented is different. As with FIG. 15, a label is placed inside each shape (e.g. label "top" 1605) so that the user may clearly associate each shape with the face or surface it represents on the target image. Because a 3D surface or object face is represented here as a shape or a series of shapes (in this example squares), an indication is given (e.g. indication "up" 1606) as to the orientation the artwork will have once applied and rotated to fit on the object or surface face so the user will be able to scale and position their artwork accordingly.

In this embodiment additional guides (e.g. guides 1607, 1608, 1609, 1610) are supplied which allow the sizing guidelines to aid not only in preparation of artwork for application to the image file but also in preparing that same artwork for printing and production in a traditional printing process, such as an offset printing press with post-printing die cutting, gluing, folding, and assembly. In this embodiment the user can both visualize and prepare final artwork using the same guidelines, where the guidelines depicted in FIG. 15 aid the user in preparing their artwork for the image file but do not specifically aid the user in preparing their artwork for printing and production. In this embodiment, this is achieved by the shapes and guides, which make up the proportional sizing guideline, being based on or defined by mechanical "die lines" used by printers to define cutting and gluing locations on a printed sheet. In this embodiment the object depicted in the image file has been constructed using very similar guidelines and thus the guidelines depicted in FIG. 16 may be used to size the artwork and to prepare the artwork for print and production. In this embodiment only surfaces that are depicted in the object image will be labeled (e.g. label "top" 1605) in order to help the user understand which faces are visible in the object image. In this embodiment, all of the faces depicted in the sizing guidelines are part of the object or surface in the scene or object image. However, the unlabeled faces are hidden from view.

In the previously mentioned embodiment, the export/import, moving, and placement of artwork from the sizing guidelines to the object or scene face or surface happens under the manual control of the invention's user. In another embodiment, the process for importing the artwork happens automatically: the apparatus in this embodiment may take the form of a self-contained software application, a plug-in extension to existing software applications, documents within imaging applications, or the form of any combination thereof. In order to automatically apply artwork placed in a specified region of the sizing guideline to the appropriate face or surface of an object or scene, the apparatus will constantly monitor the appropriate region of the sizing guideline. When a change is made to the area contained within the guideline region the apparatus will automatically load the artwork contained within that region, apply relevant two-dimensional or three-dimensional transformations and calculations in order to apply the artwork to the face or surface, and then re-render the composite resulting three-dimensional image. The appearance to the invention's user will be that the flat sizing guideline region is both a two-dimensional representation of the three-dimensional surface to which they wish to apply the artwork and that there is a precise, predictable link between artwork placed on the two-dimensional region and the artwork that automatically appears on the face or surface of the final three-dimensional object or scene image composite.

The method and apparatus described in the invention have applications to other fields as well. For example: a police sketch artist may use one embodiment of the invention which automatically applies a mug shot to a specific region of a scene (for instance, displaying a portrait of the subject within a surveillance camera image to ascertain how the actual surveillance image and the one generated by the invention compare), a commercial photographer may use another automated embodiment to apply a product image to a web page design, a hair stylist may use another embodiment of the invention to preview the face of their customer with various hairstyles, a piece of children's software may use an embodiment of the invention which is contained within a stand-alone software application to apply and display images of a child's drawings (which have been captured using a digital camera) to an animated three-dimensional scene within the software application.

It will be apparent to those skilled in the art that many modifications, both to materials and methods, may be practiced without departing from the scope of this disclosure. Accordingly, the present embodiments are to be considered as illustrative and not restrictive, and the invention is not to be limited to the details given herein, but may be modified within the scope and equivalents of the allowed claims.

I claim:

1. A non-transitory computer readable media encoded with computer executable instructions comprising a layered image file readable by an imaging application for accepting and automatically manipulating artwork within a scene of an image, said image file comprising:
   at least three layers including
      a first layer including a scene for display within the image,
      a second layer adapted to accept artwork, and
      a third layer including shading and/or and highlighting information corresponding to the scene of the first layer and adapted for the imaging application to apply to the accepted artwork of the second layer; and
   embedded data including instructions, where said instructions are within said image file prior to said image file being read by the imaging application, and where said instructions are readable by the imaging application to perform manipulations to distort the accepted artwork,
   such that, when said layered image file is read by the imaging application and when artwork is accepted in said second layer, the imaging application automatically distorts the accepted artwork according to said instructions, and shades and/or highlights the accepted artwork according to the shading and/or highlighting information.

2. The non-transitory computer-readable media of claim 1, where said imaging application is ADOBE® PHOTOSHOP®.

3. The non-transitory computer-readable media of claim 1, where said image file is editable in the imaging application.

4. The non-transitory computer-readable media of claim 1, where said image file is in TIFF format or PSD format.

5. The non-transitory computer-readable media of claim 1, where said embedded data includes data corresponding to a shape of the scene.

6. The non-transitory computer-readable media of claim 1, where said embedded data instructs the imaging application to distort the accepted artwork to appear to as being on a surface in the scene.

7. The non-transitory computer-readable media of claim 1, where said embedded data includes vanishing point information.

8. The non-transitory computer-readable media of claim 1, where said second layer is adapted to accept artwork has a mask corresponding to a region of the image, and where each mask instructs the imaging application to display the corresponding accepted artwork within the corresponding region of the image.

9. The non-transitory computer-readable media of claim 1, where said at least three layers include information to instruct imaging application to form the image by compositing said at least three layers.

10. The non-transitory computer-readable media of claim 9, where said second layer is a transparent layer.

11. The non-transitory computer-readable media of claim 9, said second layer is an opaque layer.

12. The non-transitory computer-readable media of claim 11, where at least one of said at least three layers includes shading information for compositing to form the image.

13. The non-transitory computer-readable media of claim 9, where at least one of said at least three layers includes transparency information to retain shading data in the compositing of said at least three layers.

14. The non-transitory computer-readable media of claim 9, where at least one of said at least three layers includes information for compositing the image while retaining at least some shading and/or and highlighting information.

15. The non-transitory computer-readable media of claim 9, where at least one of said at least three layers includes information instructing the imaging application to distort the image.

16. The non-transitory computer-readable media of claim 9, where said second layer includes color tinting information for the imaging application to apply to the image.

17. The non-transitory computer-readable media of claim 1, where said embedded data is presented by the imaging application as a visual representation of the surface represented by the embedded data.

18. The non-transitory computer-readable media of claim 17, where said visual representation is a grid.

19. The non-transitory computer-readable media of claim 1, where the imaging application displays said first layer on top of said second layer.

20. The non-transitory computer-readable media of claim 19, where the imaging application displays said second layer behind said third layer.

21. The non-transitory computer-readable media of claim 1, where the imaging application displays said first layer behind said second layer.

22. The non-transitory computer-readable media of claim 21, where the imaging application displays said second layer behind said third layer.

23. The non-transitory computer-readable media of claim 1, where said embedded data includes data corresponding to a three-dimensional shape of the scene, and where said at least three layers includes information to instruct imaging application to form the image by compositing said at least three layers.

24. The non-transitory computer-readable media of claim 23, where the where said embedded data includes (x, y, z) coordinate information.

25. The non-transitory computer-readable media of claim 1, where said shading and/or and highlighting information is within said image file prior to said image file being read by the imaging application.

26. A method for accepting and automatically manipulating artwork within a scene of an image as displayed by an imaging application on a computer, said method comprising:

providing an image file readable by the imaging application, where said image file includes at least three layers and embedded data, where said at least three layers includes a first layer including a scene for display within the image, and a second layer adapted to accept artwork and display the accepted artwork within a region of the image, and a third layer including shading and/or and highlighting information corresponding to the scene of the first layer and adapted for the imaging application to apply to the accepted artwork of the second layer, and where said embedded data includes instructions, where said instructions are within said image file prior to said image file being read by the imaging application, and where said instructions are readable by the imaging application to perform manipulations to distort the accepted artwork, such that, when said image file is read by the imaging application and when artwork is accepted in said second layer, the imaging application automatically distorts the accepted artwork according to said instructions, and shades and/or highlights the accepted artwork according to the shading and/or highlighting information.

27. The method of claim 26, where said imaging application is ADOBE® PHOTOSHOP®.

28. The method of claim 27, where said providing includes providing the image file over the Internet or on computer-readable media.

29. The method of claim 27, further comprising:
opening said data file within said imaging application; and
placing artwork within said second layer to display the accepted artwork within a region of the image.

30. The method of claim 26, where said image file is editable in the imaging application.

31. The method of claim 26, where said image file is in TIFF format or PSD format.

32. The method of claim 26, where said embedded data includes data corresponding to a shape of the scene.

33. The method of claim 26, where said embedded data instructs the imaging application to distort the accepted artwork to appear to as being on a surface in the scene.

34. The method of claim 26, where said embedded data includes vanishing point information.

35. The method of claim 26, where at least one layer adapted to accept artwork has a mask corresponding to a region of the image, and where each mask instructs the imaging application to display the corresponding accepted artwork within the corresponding region of the image.

36. The method of claim 26, where said at least three layers include information to instruct imaging application to form the image by compositing said at least three layers.

37. The method of claim 36, where said second layer is a transparent layer.

38. The method of claim 36, where said second layer is an opaque layer.

39. The method of claim 38, where at least one of said at least three layers includes shading information for compositing to form the image.

40. The method of claim 36, where at least one of said at least three layers includes transparency information to retain shading data in the compositing of said at least three layers.

41. The method of claim 36, where at least one of said at least three layers includes information for compositing the image while retaining at least some shading and/or and highlighting information.

42. The method of claim 36, where at least one of said at least three layers includes information instructing the imaging application to distort the image.

43. The method of claim 36, where said second layer includes color tinting information for the imaging application to apply to the image.

44. The method of claim 26, where said embedded data is presented by the imaging application as a visual representation of the surface represented by the embedded data.

45. The method of claim 44, where said visual representation is a grid.

46. The method of claim 26, where the imaging application displays said first layer on top of said second layer.

47. The method of claim 46, where the imaging application displays said second layer behind said third layer.

48. The method of claim 26, where the imaging application displays said first layer behind said second layer.

49. The method of claim 48, where the imaging application displays said second layer behind said third layer.

50. The method of claim 26, where said embedded data includes data corresponding to a three-dimensional shape of the scene, and where said at least three layers includes information to instruct imaging application to form the image by compositing said at least three layers.

51. The method of claim 50, where said embedded data includes (x, y, z) coordinate information.

52. The method of claim 26, where said shading and/or and highlighting information is within said image file prior to said image file being read by the imaging application.

* * * * *